(12) United States Patent
Choi et al.

(10) Patent No.: US 11,153,426 B2
(45) Date of Patent: *Oct. 19, 2021

(54) ELECTRONIC DEVICE AND CONTROL METHOD THEREOF

(71) Applicant: SAMSUNG ELECTRONICS CO., LTD., Suwon-si (KR)

(72) Inventors: Changhwan Choi, Suwon-si (KR); Beomseok Lee, Suwon-si (KR); Seoyoung Jo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/849,692

(22) Filed: Apr. 15, 2020

(65) Prior Publication Data

US 2020/0244791 A1    Jul. 30, 2020

Related U.S. Application Data

(63) Continuation of application No. 16/230,553, filed on Dec. 21, 2018, now Pat. No. 10,630,827.

(30) Foreign Application Priority Data

Dec. 26, 2017   (KR) .................. 10-2017-0179071

(51) Int. Cl.
*G06F 3/0481* (2013.01)
*H04M 1/724* (2021.01)
*H04M 1/03* (2006.01)
*G10L 15/22* (2006.01)

(52) U.S. Cl.
CPC ........ *H04M 1/724* (2021.01); *G06F 3/04817* (2013.01); *G10L 15/22* (2013.01); *H04M 1/03* (2013.01); *G10L 2015/223* (2013.01)

(58) Field of Classification Search
CPC ..... H04M 1/72519; H04M 1/03; G10L 15/22; G10L 2015/223; G06F 3/04817
See application file for complete search history.

(56) References Cited

U.S. PATENT DOCUMENTS

| 7,672,931 | B2 | 3/2010 | Hurst-Hiller et al. |
| 9,207,906 | B2 * | 12/2015 | Kim .................. H04M 1/7243 |
| 9,888,369 | B2 | 2/2018 | Lee et al. |
| 10,554,516 | B1 | 2/2020 | Moore et al. |

(Continued)

FOREIGN PATENT DOCUMENTS

| CN | 101213511 A | 7/2008 |
| CN | 106484831 A | 3/2017 |

(Continued)

OTHER PUBLICATIONS

International Search Report dated Apr. 9, 2019, issued by the International Searching Authority in International Application No. PCT/KR2018/016323 (PCT/ISA/210).

(Continued)

*Primary Examiner* — Christopher M Brandt
(74) *Attorney, Agent, or Firm* — Sughrue Mion, PLLC

(57) ABSTRACT

A device and method for responding to a user voice including an inquiry by outputting a response to the user's voice through a speaker and providing a guide screen including a response to the user's voice.

16 Claims, 21 Drawing Sheets

(56) References Cited

U.S. PATENT DOCUMENTS

| | | | |
|---|---|---|---|
| 2005/0064374 A1* | 3/2005 | Spector | G09B 17/006 434/169 |
| 2007/0005570 A1 | 1/2007 | Hurst-Hiller et al. | |
| 2010/0210245 A1 | 8/2010 | Kim | |
| 2013/0138443 A1* | 5/2013 | Kim | H04M 3/4936 704/270.1 |
| 2014/0324424 A1* | 10/2014 | Kim | H04M 3/4936 704/235 |
| 2015/0017958 A1* | 1/2015 | Kang | G06F 21/6263 455/414.2 |
| 2016/0014579 A1* | 1/2016 | Kasilya Sudarsan | H04W 4/16 455/417 |
| 2016/0225369 A1* | 8/2016 | Agrawal | G06F 3/04886 |
| 2017/0236513 A1 | 8/2017 | Choudhury et al. | |
| 2018/0089230 A1 | 3/2018 | Qi | |

FOREIGN PATENT DOCUMENTS

| | | |
|---|---|---|
| KR | 10-2011-0019266 A | 2/2011 |
| KR | 10-2011-0052312 A | 5/2011 |
| KR | 10-2012-0016718 A | 2/2012 |
| KR | 10-2014-0057021 A | 5/2014 |
| KR | 10-2014-0063257 A | 5/2014 |
| KR | 10-1462121 B1 | 11/2014 |
| KR | 10-2015-0005163 A | 1/2015 |
| KR | 10-2016-0133394 A | 11/2016 |
| KR | 10-2017-0032758 A | 3/2017 |

OTHER PUBLICATIONS

Written Opinion dated Apr. 9, 2019, issued by the International Searching Authority in International Application No. PCT/KR2018/016323 (PCT/ISA/210).

Communication dated Sep. 25, 2020 issued by the European Patent Office in European Application No. 18893853.4.

Communication dated Oct. 26, 2020 issued by the State Intellectual Property Office of the P.R.China in Chinese Application No. 201880068845.0.

Communication dated Mar. 30, 2021, issued by Intellectual Property India in Indian Patent Application No. 202047025426.

Communication dated Apr. 1, 2021, issued by the China National Intellectual Property Administration in Chinese Patent Application No. 201880068845.0.

Communication dated Jul. 22, 2021 issued by the State Intellectual Property Office of the P R.China in English Chinese Application No. 201880068845.0.

* cited by examiner

FIG. 1
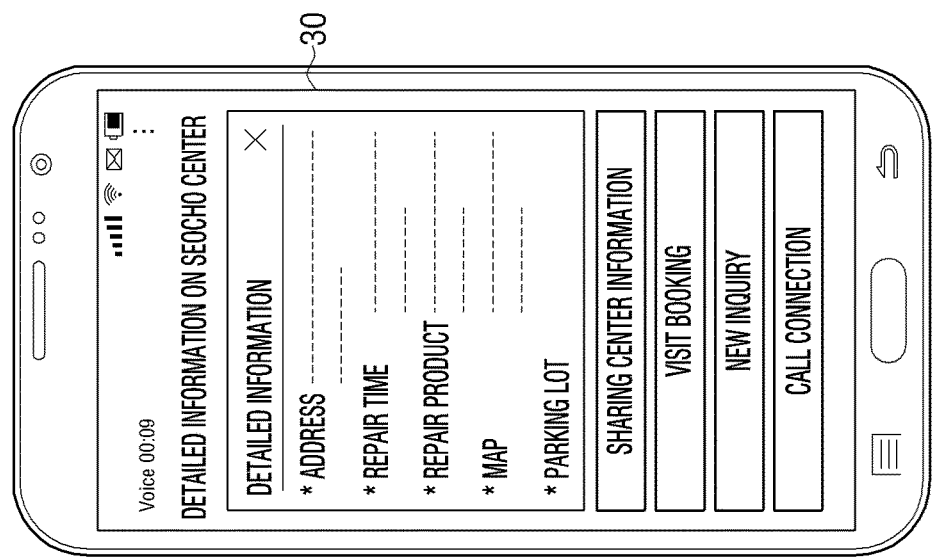
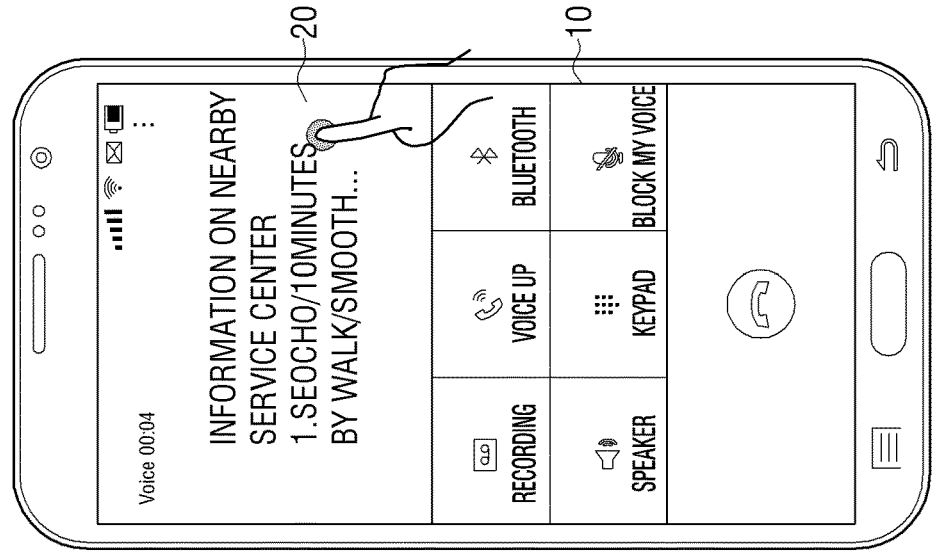
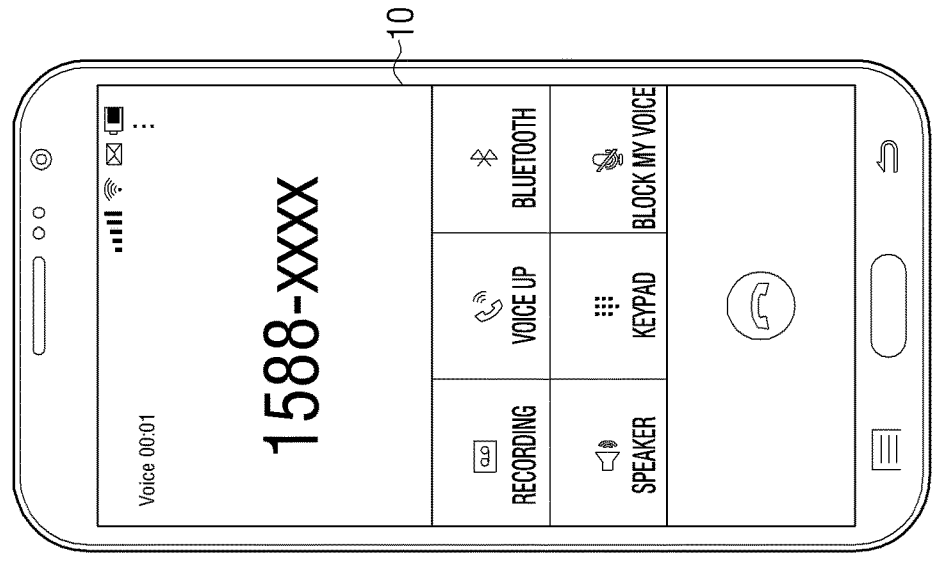

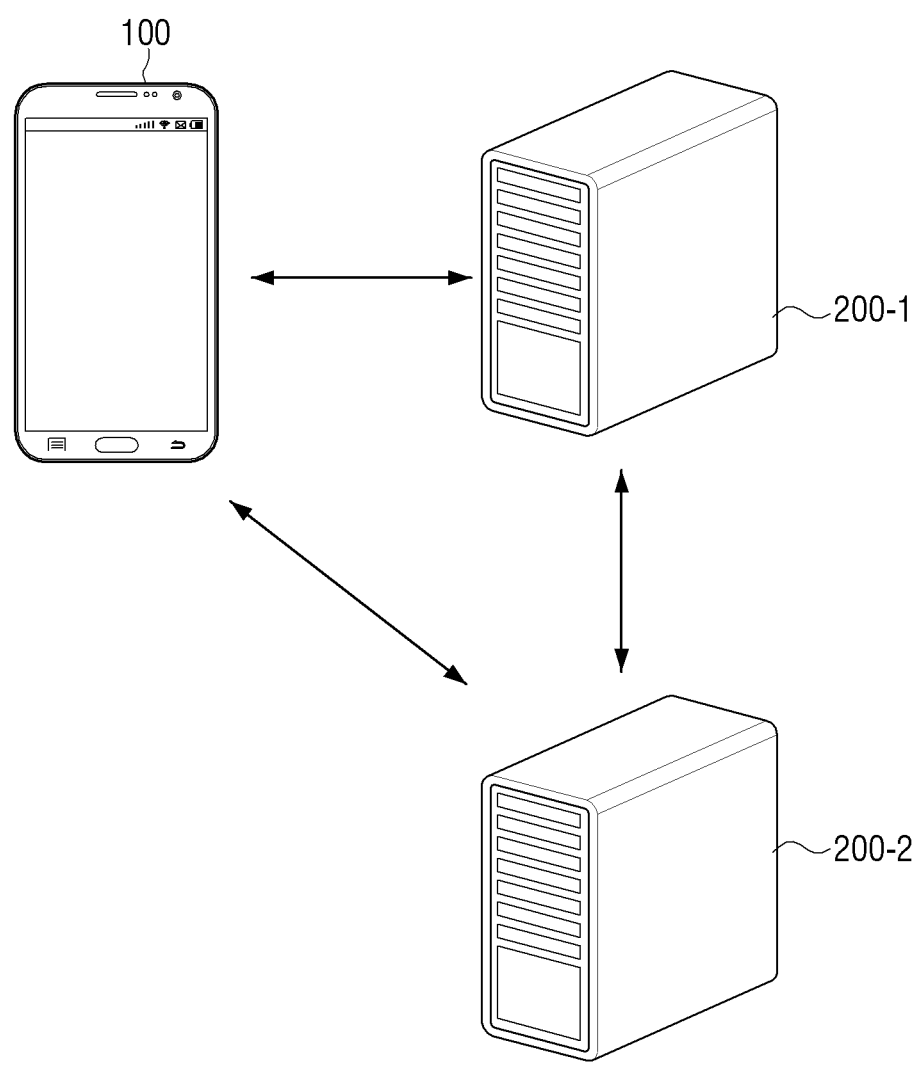

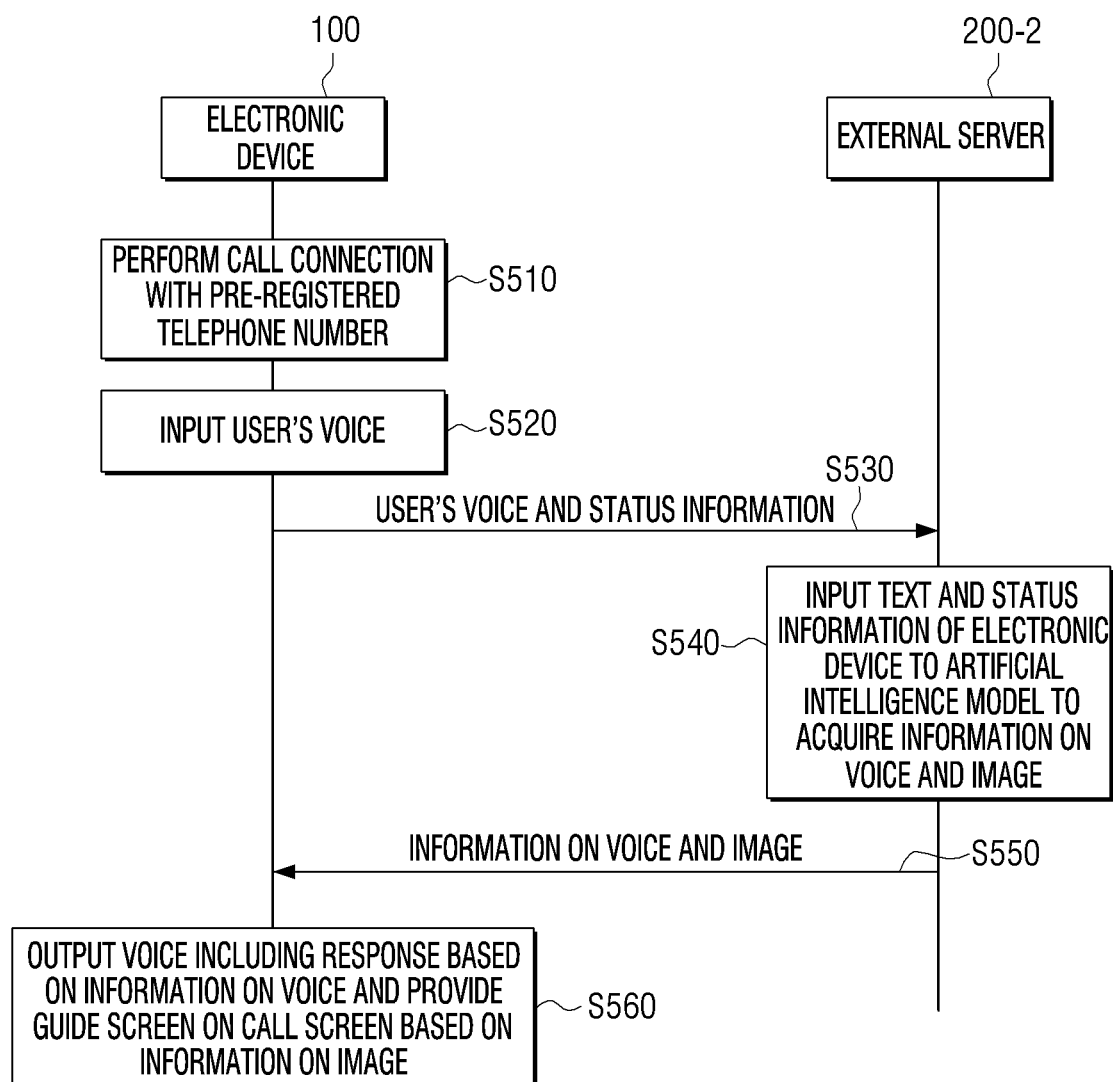

(a)  (b)

ELECTRONIC DEVICE AND CONTROL METHOD THEREOF

CROSS-REFERENCE TO RELATED APPLICATION(S)

This application is a Continuation of U.S. application Ser. No. 16/230,553, filed Dec. 21, 2018, which is based on and claims priority under 35 U.S.C. § 119 to Korean Patent Application No. 10-2017-0179071, filed on Dec. 26, 2017, in the Korean Intellectual Property Office, the disclosures of which are herein incorporated by reference in their entireties.

BACKGROUND

1. Field

Apparatuses and methods consistent with the disclosure relate to an electronic device and a controlling method thereof, and more particularly, to an electronic device capable of providing a response to a user's voice to inquire about specific information while calling as a voice and an image, and a controlling method thereof.

The disclosure is an artificial intelligence (AI) system that simulates functions of human brain, such as recognition and determination using a machine learning algorithm, and an application thereof.

2. Description of the Related Art

In recent years, artificial intelligence systems that implement human-level intelligence have been used in various fields. Artificial intelligence system is a system in which the machine learns, determines and becomes smart, unlike the existing rule-based smart system. The more the artificial intelligence systems are used, the more the recognition rate is improved. Therefore, a user's taste can be understood more accurately. As a result, existing rule-based smart systems are gradually being replaced by deep learning-based artificial intelligence systems.

Artificial intelligence technology is composed of machine learning (for example, deep learning) and element technologies that utilize machine learning.

Machine learning is an algorithm technology that classifies or learns the characteristics of input data. Element technology is a technology that simulates functions, such as recognition and determination of human brain using machine learning algorithms, such as deep learning, composed of linguistic understanding, visual understanding, reasoning or prediction, knowledge representation, motion control, etc.

Various fields in which artificial intelligence technology is applied are as follows. Linguistic understanding is a technology for recognizing, applying or processing human language or characters and includes natural language processing, machine translation, dialogue system, question & answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge or probability based inference, optimization prediction, preference-based planning, and recommendation. Knowledge representation is a technology for automating human experience information into knowledge data, including knowledge building (data generation or classification) and knowledge management (data utilization). Motion control is a technique for controlling the autonomous running of the vehicle and the motion of the robot, including motion control (navigation, collision, driving), operation control (behavior control), and the like.

Recently, various services are provided through telephone consulting. However, the conventional telephone merely provides voice in reply to a user's inquiry and thus, a user tends to feel difficulty in correctly understanding a solution to the user's inquiry. In the case of the conventional telephone consulting, a user may feel irritated because the user needs to respond to the telephone consulting according to voice messages one by one, in order to get a solution to the user's inquiry.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

An object of the disclosure is to provide an electronic device for providing a response to a user's voice as a voice and an image using a trained artificial intelligence model and a method of controlling method.

According to an embodiment, there is provided a method of controlling electronic device including establishing a call connection to a telephone number based on receiving a user input; receiving a user's voice while performing a call; transmitting the voice of the user to an external server corresponding to the telephone number; receiving from the external server, information on a voice and information on an image that are acquired by inputting the voice of the user to an artificial intelligence model that is trained through an artificial intelligence algorithm; and outputting a response to the voice of the user through a speaker based on the information on the voice and providing a guide screen including the response to the voice of the user on a screen of the electronic device based on the information on the image.

According to an embodiment, there is provided an electronic device including a display; a speaker; a microphone; a communication unit; a memory storing computer-readable instructions; and a processor electrically connected to the display, the speaker, the microphone, the communication unit, and the memory and control the electronic device, wherein the processor is configured to: establish a call connection to a telephone number based on receiving a user input, receive a voice of the user while the call connection with the telephone number is established, control the communication unit to transmit the voice of the user to an external server corresponding to the telephone number, receive from the external server, information on a voice and information on an image that are acquired by inputting the voice of the user to an artificial intelligence model that is trained through an artificial intelligence algorithm, and output a response to the voice of the user through the speaker based on the information on the voice and control the display to provide a guide screen including the response to the voice of the user based on the information on the image.

By the aforementioned disclosure, a user is able to correctly and conveniently receive a response to a user's inquiry while performing a telephone consulting. Particularly, a user may directly inquire and acquire desired information instead of acquiring information according to a predetermined voice message and thus, user convenience may be improved.

BRIEF DESCRIPTION OF THE DRAWINGS

The above and other aspects of the disclosure will be more apparent by describing certain embodiments of the disclosure with reference to the accompanying drawings, in that:

FIG. 1 is a view to describe an embodiment of providing a response to a user's voice as a voice and an image according to an embodiment;

FIG. 2 is a view illustrating a system including an electronic device and a server for providing a response to a user's voice according to an embodiment;

FIG. 5 is a flowchart to describe an embodiment of providing a response to a user's voice as a voice and an image according to another embodiment;

DETAILED DESCRIPTION OF THE EMBODIMENTS

Figure 3A:
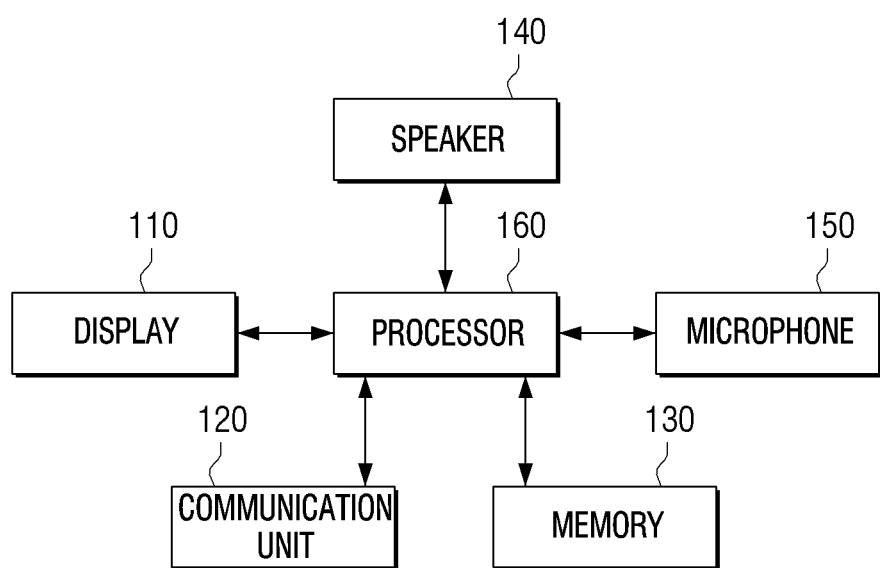
FIGS. 3A and 3B are block diagrams illustrating a configuration of the electronic device according to embodiments.

The terms and words used in the following description are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

In this document, the expressions "have," "may have," "including," or "may include" may be used to denote the presence of a feature (e.g., a numerical value, a function, an operation), and does not exclude the presence of additional features.

In this document, the expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

The terms such as "first," "second," and so on may be used to describe a variety of elements, but the elements should not be limited by these terms. The terms are labels used only for the purpose of distinguishing one element from another.

It is to be understood that an element (e.g., a first element) is "operatively or communicatively coupled with/to" another element (e.g., a second element) is that any such element may be directly connected to the other element or may be connected via another element (e.g., a third element). On the other hand, when an element (e.g., a first element) is "directly connected" or "directly accessed" to another element (e.g., a second element), it can be understood that there is no other element (e.g. a third element) between the other elements.

Herein, the expression "configured to" can be used interchangeably with, for example, "suitable for," "having the capacity to," "designed to," "adapted to," "made to," or "capable of." The expression "configured to" does not necessarily mean "specifically designed to" in a hardware sense. Instead, under some circumstances, "a device configured to" may indicate that such a device can perform an operation along with another device or part. For example, the expression "a processor configured to perform A, B, and C" may indicate an exclusive processor (e.g., an embedded processor) to perform the corresponding operation, or a generic-purpose processor (e.g., a central processor (CPU) or application processor (AP)) that can perform the corresponding operations by executing one or more software programs stored in the memory device.

An electronic apparatus and an external device in accordance with various embodiments of the disclosure may include at least one of, for example, smartphones, tablet PCs, mobile phones, video telephones, electronic book readers, desktop PCs, laptop PCs, netbook computers, workstations, servers, a PDA, a portable multimedia player (PMP), an MP3 player, a medical device, a camera, or a wearable device. A wearable device may include at least one of the accessory type (e.g., as a watch, a ring, a bracelet, a bracelet, a necklace, a pair of glasses, a contact lens or a head-mounted-device (FIMD)); a fabric or a garment-embedded type (e.g., a skin pad or a tattoo); or a bio-implantable circuit. In some embodiments, the electronic apparatus may be, for example, a television, a digital video disk (DVD) player, audio, refrigerator, cleaner, ovens, microwaves, washing machines, air purifiers, set top boxes, home automation control panels, security control panels, media box (e.g.: Samsung FlomeSync™, Apple TV™, or Google TV™), game consoles (e.g., Xbox™, PlayStation™), electronic dictionary, electronic key, camcorder, or electronic frame.

In other embodiments, the electronic apparatus and the external device may include at least one of a variety of medical devices (e.g., various portable medical measurement devices such as a blood glucose meter, a heart rate meter, a blood pressure meter, or a temperature measuring device), magnetic resonance angiography (MRA), magnetic resonance imaging (MRI), computed tomography (CT), or ultrasonic wave device, etc.), navigation system, global navigation satellite system (GNSS), event data recorder (EDR), flight data recorder (FDR), automotive infotainment devices, marine electronic equipment (e.g., marine navigation devices, gyro compasses, etc.), avionics, security devices, car head units, industrial or domestic robots, drone, ATMs, points of sale of stores, or IoT devices (e.g., light bulbs, sensors, sprinkler devices, fire alarms, thermostats, street lights, toasters, exercise equipment, hot water tanks, heater, boiler, etc.).

In this disclosure, the term user may refer to a person who uses an electronic apparatus or an apparatus (example: artificial intelligence electronic apparatus) that uses an electronic apparatus.

FIG. 1 is a view to describe an embodiment of providing a response to a user's voice as a voice and an image according to an embodiment.

First, the electronic device 100 may register a telephone number for providing a response to a user inquiry through a video as well as a voice, according to a user command. At this time, the electronic device 100 can register the telephone number and information on an external server corresponding to the telephone number. As an example, according to one embodiment of the disclosure, the telephone number may be a telephone number for customer consultation, a telephone number for food delivery, or a telephone number for a restaurant reservation.

The electronic device 100 can perform a call connection to a previously registered telephone number according to a user command. For example, if a telephone number previously registered by a user is selected while a telephone application is being executed, and then a calling command is input, the electronic device 100 can perform a call connection to a previously registered telephone number. At this time, the electronic device 100 can provide the call screen 10 through the display during the call connection, as shown in (a) of FIG. 1.

Also, when the call connection is performed to the previously registered telephone number, the electronic device 100 can execute an artificial intelligence dedicated program. Alternatively, when the artificial intelligence dedicated program is in an inactive state, the electronic device 100 can activate the artificial intelligence exclusive program. Here, the artificial intelligence dedicated program is a program for providing a response to the user's voice as a voice and an image. The program may be called various terms such as a visual assistant, a personal assistant program, etc.

After the call connection to the previously registered telephone number is performed, the electronic device 100 can receive the user's voice through the microphone. Here, the user's voice may be a user's voice for inquiring specific information, for example, a voice called "Please inform me of a service center to repair mobile phone."

The electronic device 100 can transmit a user's voice input through a microphone to an external server. At this time, the external server may include a first server for converting the user's voice into a text, or converting the text into a voice message, and a second server for providing information on the voice and an image including the response to the user's voice based on the converted text, but this is only exemplary and the embodiment can be implemented as a single server.

The external server can convert the user's voice received from the electronic device 100 into text through the Speech to Text (STT) technology. The external server can input the converted text into the artificial intelligence model trained through the artificial intelligence algorithm to acquire information on the voice and the image including the response to the user's voice. Here, the information about the voice may be transmitted to the electronic device 100 as audio data in the form of a voice message including a response to the user's voice. According to another embodiment, the information about the voice is text information obtained by the second server, and may be converted into a voice message by the first server using a text to speech (TTS) technique and transmitted to the electronic device 100. Further, the information on the image may be information such as text, image, URL, etc., including a response to the user's voice. In addition, information on the voice may be the same as information on the image but this is merely exemplary and may include a part of information on the image or information that summarizes an image.

The external server may provide information about the voice and image including the response to the user's voice to the electronic device 100. For example, the information about the voice may be "This is a guide about a nearby service center location. A nearby service center is located at ~," and the information about the image may be an image or URL information including information on a nearby service.

Also, the electronic device 100 can transmit status information (for example, the position information of the electronic device) of the electronic device acquired from a sensor together with the user's voice to the external server. At this time, the external server may input the status information of the electronic device together with the user's voice to the artificial intelligence model to obtain the information about the voice and the image including the response to the user's voice and transmit the information to the electronic device 100.

The electronic device 100 may provide a response to the user's voice based on the received voice and image information. Specifically, the electronic device 100 can output a response to the user's voice through the speaker based on the information of the received voice. In addition, the electronic device 100 may provide a guide screen 20 including a response to the user's voice on the call screen 10 based on information about the image. For example, the electronic device 100 may output a voice message (or ARS message) the speaker as a response to the user's voice, "This is a guide about a nearby service center location. A nearby service center is e nearby service center is located at ~." The electronic device, as illustrated in (b) of FIG. 1, may provide the guide screen 20 including information on the service center as a response to the user's voice on a part of an area of the call screen 10.

At this time, when the user's additional voice is input, the electronic device 100 may receive the voice and image information including the response to the additional voice from the external server through the operation as described above, and provide the response regarding the additional voice as a voice and an image.

In addition, when a user input is received on the guide screen, the electronic device 100 may provide a guide screen including new information according to user input. For example, as illustrated in (b) of FIG. 1, while the guide screen 20 including brief information on the service center is being displayed, a user's input to touch an area of the guide screen 20 is received. The electronic device 100, as illustrated in (c) of FIG. 1, may provide a guide screen 30 including detailed information on the service center. Here, the guide screen 30 may be extended by the user's input and displayed as a full screen on the display of the electronic device 100.

Also, when a user command for transmitting an image to an external server is input while the guide screen is provided, the electronic device 100 can transmit an image to an external server according to a user command. At this time, the image is an image for acquiring detailed information, for example, an image representing the location of the current user, an image representing the state of the failed electronic device, and the like. The external server may input an image to the artificial intelligence model to obtain information about the voice and the image including the response to the image, and may transmit the information about the obtained voice and image to the electronic device 100. For example, if the received image is an image representing the location of the current user, the information about the voice and the image may be information indicating the movement path from the user's location to the service center.

The electronic device 100 may output a response to the image based on the information about the voice acquired by inputting the image, and provide a response regarding the image on the guide screen based on the information about the image obtained by inputting the image.

Meanwhile, the trained model provided by the external server as described above may be a judgment model trained based on an artificial intelligence algorithm, for example, a model based on a neural network. The trained judgment model may include a plurality of weighted network nodes that may be designed to simulate the human brain structure on a computer and simulate a neuron of a human neural network. The plurality of network nodes may each establish a connection relationship so that the neurons simulate the synaptic activity of the neurons sending and receiving signals through the synapse. Also, the trained judgment model may include, for example, a neural network model or a deep learning model developed from a neural network model. In the deep learning model, a plurality of network nodes may be located at different depths (or layers), and send and/or receive data according to a convolution connection relationship. Examples of trained judgment models may include, but are not limited to, Deep Neural Network (DNN), Recurrent Neural Network (RNN), Bidirectional Recurrent Deep Neural Network (BRDNN).

The electronic device 100, in order to receive a response to the user's voice as voice and an image, may use a personal assistant program that is an artificial intelligence dedicated program (or an artificial intelligence agent). Here, the personal assistant program is a dedicated program to provide an AI-based service and may be executed by a general use processor (for example, CPU) or a separate AI-dedicated processor (for example, GPU, etc.).

Specifically, if a preset user input (for example, an icon touch corresponding to a personal assistant chatbot, a user's voice including a predetermined word, and the like) is input or a button (for example, a button to execute an artificial intelligent agent) provided on the electronic device 100 is pressed, or a call connection is performed with a previously registered telephone number, the artificial intelligence agent can be operated (or executed). The artificial intelligent agent may transmit the input user's voice to the external server, provide a response to the user's voice through the speaker based on the information about the voice received from the external server, and provide a guide screen including the response to the user's voice based on information on the image received from an external server.

If a predetermined user's input is detected on the screen or a button (for example, a button for executing an AI agent) is pressed or a call connection is made to a previously registered telephone number, the AI agent may be operating. Alternatively, the artificial intelligent agent may be in a state that the predetermined user input is sensed, or a button provided in the electronic device 100 is selected, or before the telephone connection to the previously registered telephone number is performed. In this case, after a predetermined user input is detected or a button provided on the electronic device 100 is selected or a call connection is performed to a previously registered telephone number, the AI agent of the electronic device 100 may provide voice and image that includes a response to the user's voice. Also, the AI agent may be in a standby state before a predetermined user input is detected or a button provided in the electronic device 100 is selected or a call connection is performed to a previously registered telephone number. Here, the standby state is a state that a predefined user input is received to control the start of operation of the AI agent. If the predetermined user input is detected while the artificial intelligent agent is in the standby state, or a button provided on the electronic device 100 is selected and the call connection is performed to the registered telephone number, the electronic device 100 may operate the AI agent and provide voice and image including a response to the user's voice.

In another embodiment of the disclosure, when the electronic device 100 uses the artificial intelligence model to obtain information about voice and image that includes a response to the user's voice, the AI agent may control the AI model to acquire information about the voice and the image. At this time, the AI agent can execute operations described above with respect to the external server.

FIG. 2 is a view illustrating a system including an electronic device and a server for providing a response to a user's voice according to an embodiment. As illustrated in FIG. 2, the system may include the electronic device 100, a first server 200-1 and a second server 200-2.

The electronic device 100 may store a program dedicated to artificial intelligence. The electronic device 100 may transmit the user's voice to the external first server 200-1 using the artificial intelligence dedicated program, output voice including the response to the user's voice to the speaker based on information on the voice received from the first server 2001, and output a guide screen including a response to the user's voice based on information about the image received from the second server 200-2.

When an event for registering a new telephone number (for example, an event for receiving information on a new telephone number from an external source, an event for inputting a user command for registering a new telephone number, etc.) occurs, the electronic device 100 can register a new telephone number, and at this time, information on the second server 200-2 corresponding to the new telephone number can be stored in association with the telephone number.

The electronic device 100 can perform a call connection to a previously registered telephone number according to a user command. Here, when the call connection is performed, the electronic device 100 can execute (or activate) the artificial intelligence dedicated program. The electronic device 100 may also transmit a signal indicating that the call connection is performed to at least one of the first server 200-1 and the second server 200-2.

After call connection is performed, the electronic device 100 may receive a user's voice through a microphone. Here, the user's voice may be in the form of an inquiry seeking specific information.

If a user's voice is input, the electronic device 100 may transmit the input user's voice to the external first server 200-1. The electronic device 100 may transmit status information (for example, GPS information, etc.) of the electronic device 100 obtained by the sensor to the second server 200-2.

The first server 200-1 may convert the received user's voice from audio data to text data using the STT technology, and transmit the converted text data to the second server 200-2.

The second server 200-2 may input the received text data to the AI model that is trained using an AI algorithm and acquire information on voice and an image as a response to the user's inquiry. Here, the AI model may be a model that is trained to acquire information on the voice and image including a response to the text regarding specific information by inputting a text. In particular, the second server 200-2 may store an AI model that corresponds to the telephone number for that call is connected. For example, if the telephone number for call connection is a number for customer service, the AI model may be a model that is trained to acquire a response for the customer service. In addition, if the telephone number for call connection is a number for restaurant reservation, the AI model may be a model trained to acquire a response to reserve a restaurant.

When the status information of the electronic device 100 is received from the electronic device 100, the second server 200-2 inputs the status information of the electronic device 100 together with the text into the artificial intelligence model and obtain information about the voice and the image including the response to the user's voice. For example, when the location information of the electronic device 100 is received together with the text inquiring the customer center, the second server 200-2 inputs the location information of the electronic device 100 together with the text in the artificial intelligence model to acquire information on the voice and the image for guiding the location of the customer center on the basis of the current location of the user.

Here, the information about the voice may be text data, but this is merely exemplary, and the information may be audio data. At this time, if the information about the voice is text data, the information about the voice may be transmitted to the first server 200-1, converted into audio data through the TTS technology, and transmitted to the electronic device 100. Also, if the information about the voice is audio data, information about the voice may be directly transmitted to the electronic device 100.

Also, the information about the image may be at least one of text data, image data, and moving image data, but this is merely exemplary and the disclosure is not limited thereto. The information may be address information (for example, URL information) of the web page including at least one of text, image, and a moving image.

The electronic device 100 may output a voice message including a response to the user's voice to the speaker based on the received voice information. Also, the electronic device 100 may provide a guide screen on the call screen including a response to the user's voice based on the information about the received image.

While the guide screen is displayed, when a user's input (for example, a user's touch, user's additional voice, user's input to transmit an image, etc.) is received, the electronic device 100 may perform an additional operation according to the user's input.

In the above-described embodiment, the external server is divided into the first external server 200-1 and the second external server 200-2. However, the disclosure is not limited thereto and the external server 200-1 and the second external server 200-2 may be implemented as a single server. That is, one server can convert the user's voice received from the electronic device 100 into text data, and acquire information on the voice and image including a response to the user's voice by inputting the text data to the AI model. In addition, if a server is implemented as a single server, the electronic device 100 may convert the user's voice to text and transmit text data to an external server.

As illustrated in FIG. 3A, the electronic device 100 may include the display 110, the communication unit 120, a memory 130, a speaker 140, a microphone 150 and a processor 160. The configurations shown in FIG. 3A are exemplary diagrams for implementing embodiments of the disclosure, and appropriate hardware and software configurations apparent to those skilled in the art may be further included in the electronic device 100.

The display 110 may provide various screens. In particular, if a call connection has been made, the display 110 may provide a call screen. Here, the call screen may include a plurality of icons for controlling the telephone conversation, tog ether with information (e.g., a telephone number, a caller's name, a group to which the telephone number is registered, etc.).

Upon receiving the information about the image including the response to the user's voice from the external server after the call connection with the previously registered phone number is performed, the display 110 may provide a guide screen including a response to a user's voice on a screen according to the control of the processor 160. At this time, the display 110 may display the guide screen in one area of the call screen or display the guide screen in the form of a pop-up window but this is only an embodiment, and the guide screen can be displayed through the entire screen.

The communication unit 120 can perform communication with an external device through various communication methods. In particular, the communication unit 120 can transmit the user's voice to the external server 200, and can receive information on the voice and the image including the response to the user's voice from the external server 200. Here, the communication unit 120 can perform communication with various types of external devices according to various types of communication protocols. The communication unit 120 may include at least one of a Wi-Fi chip, a Bluetooth chip, and a wireless communication chip (4G, 5G, etc.). The processor 160 can communicate with an external server or various external devices using the communication unit 120. In addition, the communication unit 120 can perform communication with an external device through various communication chips such as an NFC chip.

The memory 130 may store instructions or data related to at least one other element of the electronic device 100. In particular, the memory 130 may be implemented as a non-volatile memory, a volatile memory, a flash memory, a hard disk drive (HDD), or a solid state drive (SSD). The memory 130 is accessed by the processor 160, and the reading, recording, modifying, deleting, and updating of the data can be performed by the processor 160. In this disclosure, the term memory may include the memory 130, the ROM (not shown), RAM inside the processor 160, or the memory card (for example, micro SD card, memory stick) mounted to the electronic device 100. In addition, the memory 130 may store a program and data, to configure various screens to be displayed in the display area of the display 110.

In particular, the memory 130 may store an artificial intelligence exclusive program. At this time, the artificial intelligence dedicated program is a personalized program for providing various services for the electronic device 100. In particular, artificial intelligence dedicated programs can provide a response as the user's voice and an image.

According to an embodiment, the memory 130 may store the trained AI model to provide a response to the user's voice as a voice and an image.

The speaker 140 is a configuration to output audio data for which various processing jobs such as decoding, amplification, and noise filtering are performed, but also notifications or a voice message. In particular, the speaker 140 may output the voice message information obtained based on the information on the voice including the response to the user's voice. At this time, a plurality of speakers 140 may be provided in a plurality of areas of the electronic device (for example, an upper area of the front surface of the electronic device or a lower side area of the electronic device, etc.).

The microphone 150 is a configuration to receive a user's voice. Here, the microphone 150 may be provided inside the electronic device 100 to receive a user's voice, but this is merely exemplary and can be implemented by an external microphone electrically connected to the electronic device 100.

The processor 160, electrically connected via one or more busses to the display 110, the communication unit 120, the memory 130, the speaker 140, and the microphone 150, may control overall operations and functions of the electronic device 100.

Specifically, the processor 160 performs a call connection with to a pre-registered telephone number according to a user command, receives a user's voice through the microphone 150 during a telephone conversation, controls the communication unit 120 to transmit the input user's voice to an external server corresponding to a pre-registered telephone number, receives information obtained by inputting the user's voice to the artificial intelligence model trained through the artificial intelligence algorithm, outputs a response to the user's voice through the speaker 140 based on the information on the received voice, and controls the display 110 to provide a guide screen including a response to a user's voice on a call screen based on information on an image.

In addition, the processor 160 receives the user's additional voice through the microphone while the guide screen is being provided, controls the communication unit 120 to transmit the additional voice to the external server, receives from an external server information regarding voice and image acquired by inputting the additional voice to the AI model, outputs a response to the additional voice to through the speaker 140 based on information on voice obtained by inputting additional voice, and controls the display 110 to provide a response to additional voice on a guide screen based on information on an image acquired by inputting additional voice. That is, a user may actively input additional voice to keep acquiring information a user desires even though the user does not follow a predetermined voice message while the guide screen is being displayed.

That is, the user can actively input additional voices and continue to acquire the information desired by the user even if the user does not follow the predetermined voice message while the guide screen is displayed In addition, the processor 160 may control the communication unit 120 to transmit status information (for example, position information and movement information, etc.) of the electronic device acquired using the sensor (180 of FIG. 3b) to an external server. Here, information on the voice and image can be acquired by inputting status information of the electronic device along with the user's voice to the AI model.

In addition, the processor 160 controls the communication unit 120 to transmit an image to an external server according to a user corn bile a guide screen is provided, receives information on the voice and image obtained by inputting an image to the AI model from an external server through the communication unit 120, outputs a response to an image through the speaker 140 based on information on voice acquired by inputting an image, and controls the display 110 to provide a response regarding an image on a guide screen based on information on an image acquired by inputting an image.

When call connection is performed with the pre-registered phone number, the processor 160 may execute an AI dedicated program to provide a response to the user's voice as voice and image.

In addition, the processor 160 receives the additional voice through the microphone 150 while the guide screen is being provided, and can register information related to the additional voice in the application that interworks with the artificial intelligence dedicated program. For example, when additional voice for service center reservation is input via the microphone 150, the processor 160 may register reservation information related to the additional voice in the calendar application that interworks with the artificial intelligence dedicated program.

Also, when a user command for registering a specific telephone number is input, the processor 160 can register an external server corresponding to a specific telephone number and a specific telephone number in the memory 130. Thereafter, when a call connection to the registered telephone number is performed, the processor 160 can execute a program dedicated to artificial intelligence to provide a response to the user's voice as an image as well as a voice.

In the meantime, the guide screen according to an embodiment may include at least one icon. Here, the at least one icon may include an icon for providing information, an icon for performing a call connection with a related telephone number and an icon for providing a UI for sharing related information, but the disclosure is not limited thereto.

Figure 3B:
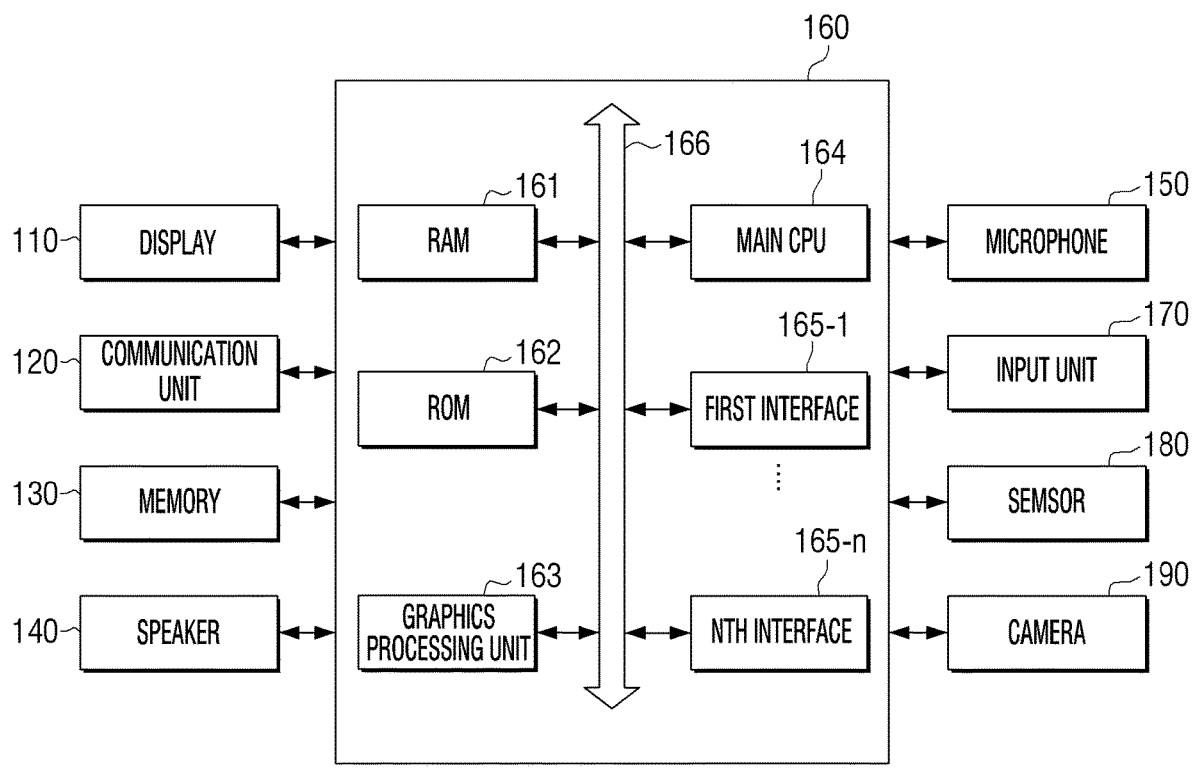

FIG. 3B is a block diagram illustrating the configuration of the electronic device 100, according to an embodiment of the disclosure. As illustrated in FIG. 3B, the electronic device 100 may include the display 110, the communication unit 120, the memory 130, the speaker 140, the microphone 150, an input unit 170, a sensor 180, a camera 190, and the processor 160. Since the display 110, the communication unit 120, the memory 130, the speaker 140, and the microphone 150 have been described with reference to FIG. 3A, redundant descriptions thereof will be tied.

The input unit 170 may receive various user inputs and transmit the inputs to the processor 160. In particular, the input unit 170 may include a touch sensor, a (digital) pen sensor, a pressure sensor, a key, or a microphone. The touch sensor can use, for example, at least one of an electrostatic type, a pressure sensitive type, an infrared type, and an ultrasonic type. The (digital) pen sensor may be, for example, part of a touch panel or may include a separate recognition sheet. The key may include, for example, a physical button, an optical key, or a keypad. The microphone may be provided inside the electronic device 100 for receiving the user's voice but may be provided outside the electronic device 100 to be electrically connected to the electronic device 100.

In particular, the input unit 170 may include a preset user touch for selecting an icon corresponding to the AI dedicated program, a user input for selecting a button provided outside the electronic device 100, and acquire an input signal according to a user input for performing a call connection with the pre-registered telephone number. The input unit 170 may then transmit the input signal to the processor 160.

The sensor 180 may acquire sensing data for acquiring status information of the electronic device 100. The sensor 180 may include a GPS sensor to acquire position information of the electronic device 100 and may include various motion sensors such as an acceleration sensor, a gyro sensor, a geomagnetic sensor, and the like in order to acquire motion information of the electronic device 100. In addition, the sensor 180 may further include a sensor or the like capable of acquiring environmental information such as temperature, humidity, etc. around the electronic device 100.

As another example of the disclosure, the electronic device 100 may acquire status information of the electronic device 100 with methods other than the sensor 180. For example, the electronic device 100 may acquire position information of the electronic device 100 using the Wi-Fi chip of the communication unit 120.

The camera 190 may take an image including an object outside the electronic device 100. At this time, the camera 190 may be provided on at least one of the front and rear of the electronic device 100. The camera 190 may be provided inside the electronic device 100 but may be connected to the electronic device 100 via a wired or wireless connection, and the camera 190 may be present outside of the electronic device 100.

The processor 160 (or the controller) may control overall operations of the electronic device 100 by reading and executing various programs stored in the memory 130.

The processor 160 may include a RAM 161, a ROM 162, a graphics processing unit 163, a main CPU 164, first to n interfaces 165-1 to 165-n, and a bus 166. Here, the RAM 161, the ROM 162, the graphics processing unit 163, the main CPU 164, the first to n interfaces 165-1 to 165-n, etc. may be connected to each other via the bus 166.

Figure 4:
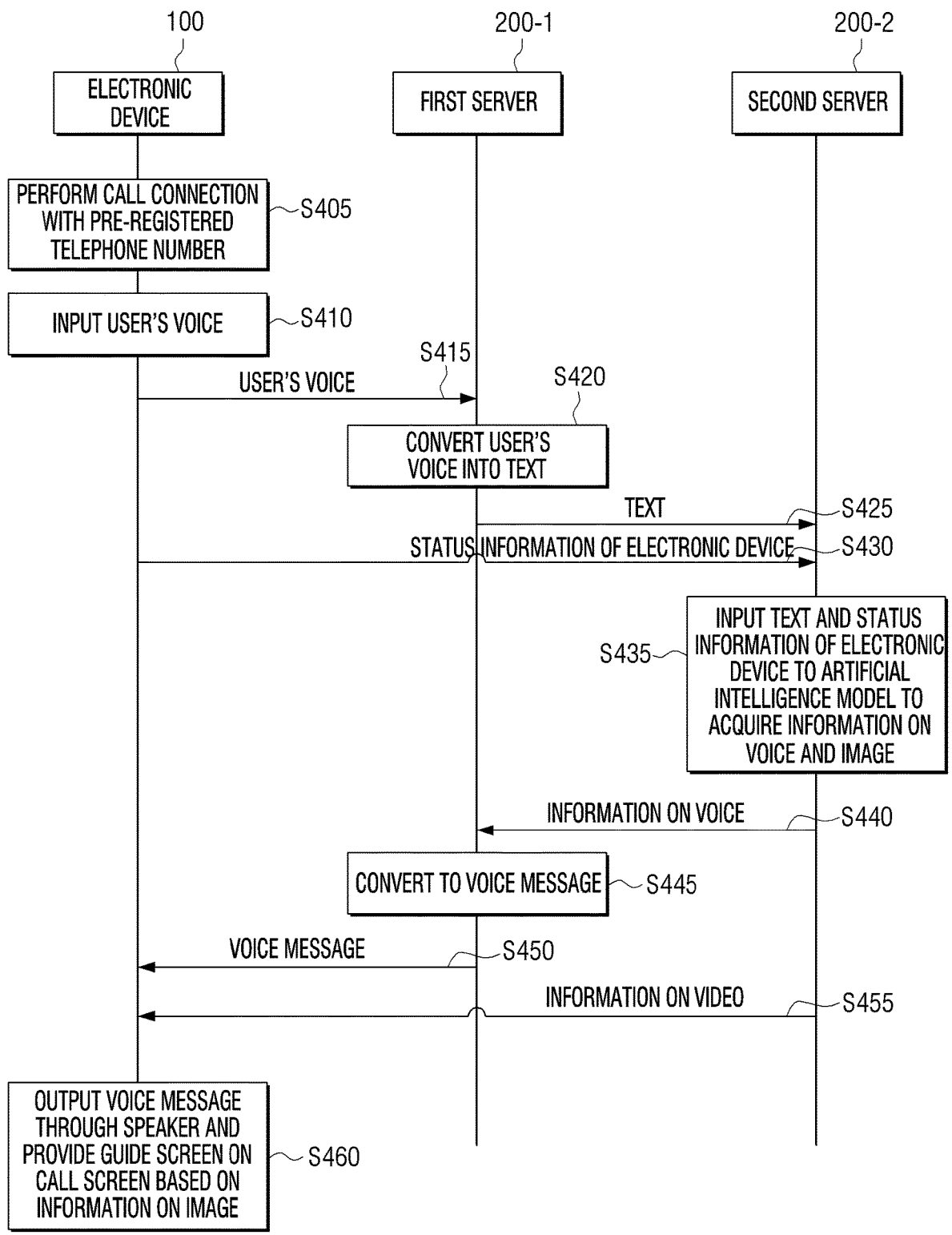
FIG. 4 is a flowchart to describe an embodiment of providing a response to a user's voice as a voice and an image according to an embodiment.

FIG. 4 is a flowchart to describe an embodiment of providing a response to a user's voice as a voice and an image according to an embodiment.

First, the electronic device 100 can perform call connection to a previously registered telephone number (S405). At this time, the electronic device 100 can execute the artificial intelligence dedicated program. In addition, the pre-registered telephone number may be a telephone number for requesting specific information or receiving a specific service, for example, a variety of telephone numbers such as a customer consultation telephone number, a restaurant reservation telephone number, a travel reservation telephone number.

The electronic device 100 may receive a user's voice (S410). Here, the user's voice may an inquiry seeking specific information.

The electronic device 100 may transmit the input user's voice to the first server 200-1 (S415). Here, the user's voice may be in a form of audio data.

The first server 200-1 may convert the received user's voice to text (S420). To be specific, the first server 200-1 may convert user's voice in a format of audio to text using STT technology.

The first server 200-1 may transmit the converted text to the second server 200-2 (S425). The electronic device 100 may also use the sensed data obtained from the sensor 180 to obtain status information of the electronic device 100. The electronic device 100 may transmit the obtained status information to the second server 200-2 (S430). At this time, the status information of the electronic device 100 may be transmitted by the request of the second server 200-2, but this is only an example and the status information may be transmitted with the user's voice.

The second server 200-2 can input the text and status information of the electronic device into the AI model to obtain information about the voice and the image (S435). At this time, the AI model may be a model trained by inputting text and status information and acquiring information about a voice and an image including a response to a user's voice. In addition, the information about the voice and the image obtained through the artificial intelligence model may include a response to the user's voice. That is, the information about the voice and the image obtained through the artificial intelligence model may include information about the service or information requested by the user.

The second server 200-2 may transmit information on a voice to the first server 200-1 (S440). Here, the information on the voice may text data including information requested by a user.

The first server 200-1 may convert information on a voice to a voice message (S445). That is, the first server 200-1 may convert information on a voice in a format of text data to voice message (that is, audio data) through TTS technology.

Also, the second server 200-2 may transmit information about the image to the electronic device 100 (S455). At this time, the information about the image may include at least one of a text, an image, and a moving image, and information about a web page for providing at least one of text, images, and moving images. In particular, according to one embodiment of the disclosure, step S455 may be performed after step S445, but this is only an example, and steps S445 and S455 may be performed simultaneously.

The electronic device 100 may output the voice message received from the first server 200-1 to the speaker 140 and provide a guide screen on the call screen based on information on the received image from the second server 200-2 (S460). Here, the guide screen may include a response to a user's voice and include a UI to receive a user's command in addition to a text, an image, and a moving image. By this, a user may receive a response regarding a user's inquiry not only as a voice but also an image.

FIG. 5 is a flowchart to describe an embodiment of providing a response to a user's voice as a voice and an image according to another embodiment.

The electronic device 100 may establish a call connection to the pre-registered telephone number (S510).

The electronic device 100 may receive a user's voice (S520), Here, a user's voice may be an inquiry seeking specific information.

The electronic device 100 may transmit the input user's voice and the status information of the electronic device 100 to the first server 200-1 (S530). At this time, the user's voice may be audio data, but this is only an example and the audio data may be converted into text data by the electronic device 100.

The external server 200 may input text and status information of the electronic device 100 into the artificial intelligence model to obtain information about the voice and the image (S540). At this time, the AI model may be a trained model for acquiring information about a voice and an image including a response to a user's voice by inputting user's voice and status information. Here, the user's voice may be text data or audio data.

The external server 200 may transmit the information on voice and image to the electronic device 100 (S550). Here, the information about the voice may include audio data as information including a response to the user's voice, but this may be text data, which is merely an example. In addition, the information on the image may include at least one of text, images, and moving images, and information (e.g., URL information) about a web page for providing at least one of text, images, and moving images.

The electronic device 100 may output a voice including a response to a user's voice to a speaker based on information on a voice, and provide a guide screen including a response on a call screen based on information on an image (S560).

FIGS. 6A to 6E are views to describe an embodiment of providing a response to a user's voice as a voice and an image according to an embodiment.

Figure 6A:
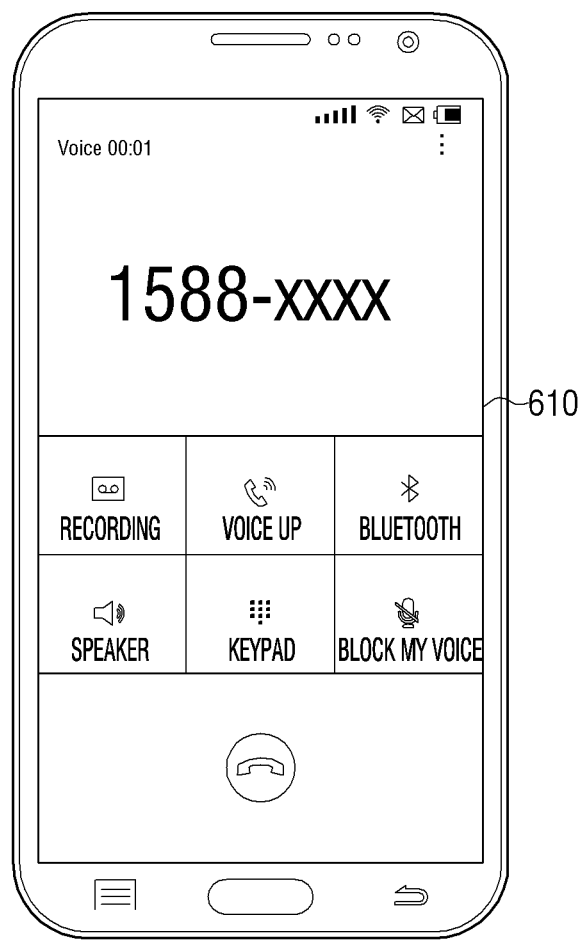
FIGS. 6A, 6B, 6C, 6D, and 6E are views to describe an embodiment of providing a response to a user's voice as a voice and an image according to an embodiment.

First, the electronic device 100 performs a call connection to a previously registered telephone number according to a user input, Specifically, when a call button is pressed after a previously registered telephone number (for example, 1588-XXXX) is pressed while the telephone application is being executed, as shown in FIG. 6A, the call screen 610 may be provided and call connection with the pre-registered telephone number can be performed. Here, the pre-registered phone number may be a number for a customer service.

After the call connection is performed, the electronic device 100 can receive the user's voice through the microphone 150. At this time, the user's voice may include a voice "Please inform the service center." The electronic device 100 can transmit the input user's voice to the external server 200.

Here, the external server 200 may transmit a signal requesting the position information of the electronic device 100 to the electronic device 100, and the electronic device 100 may, in response to the signal, transmit position information of the electronic device 100 to the external server 200. Alternatively, the electronic device 100 may transmit the location information of the electronic device 100 together with the user's voice, and may transmit the location information of the electronic device 100 to the external server 200 at a predetermined cycle.

The external server 200 may input the user's voice (or text in which user's voice is converted) and position information to an AI model and acquire information on voice and image including a response to a user's voice. The external server 200 may then transmit information about the voice and video including the response to the user's voice to the electronic device 100.

Figure 6B:
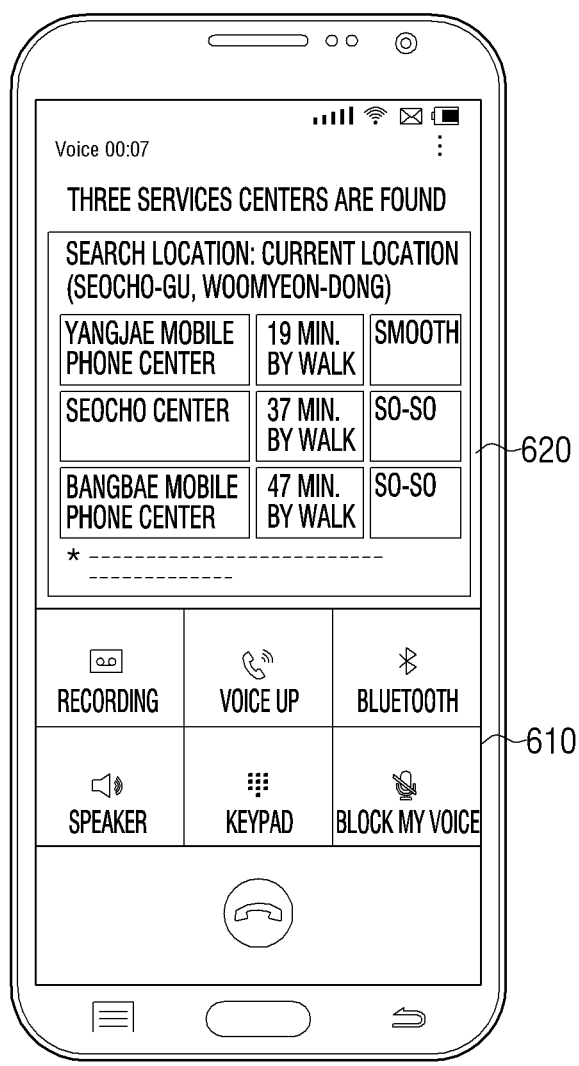

Based on the information on the voice, the electronic device 100 may output the voice message "Three nearby locations are found: Yangjae Mobile Center, Seocho Center, and Bangbae Mobile Center. If you want a center in a specific location, please let me know the name of Dong, Gu, and Gun of the corresponding area" through the speaker 140. As shown in FIG. 6B, the guide screen 620 including information on the service center can be provided, in response to a user's voice on one area of the call screen 610.

While the guide screen 620 is being displayed, when the user's first additional voice "please let me know a location of Seocho Center" is input, the electronic device 100 may transmit the input first additional information to the external server 200.

The external server 200 may input the first additional information to the AI model to acquire information on voice and image including a response to the first additional voice and transmit information on the acquired voice and image to the electronic device 100.

Figure 6C:
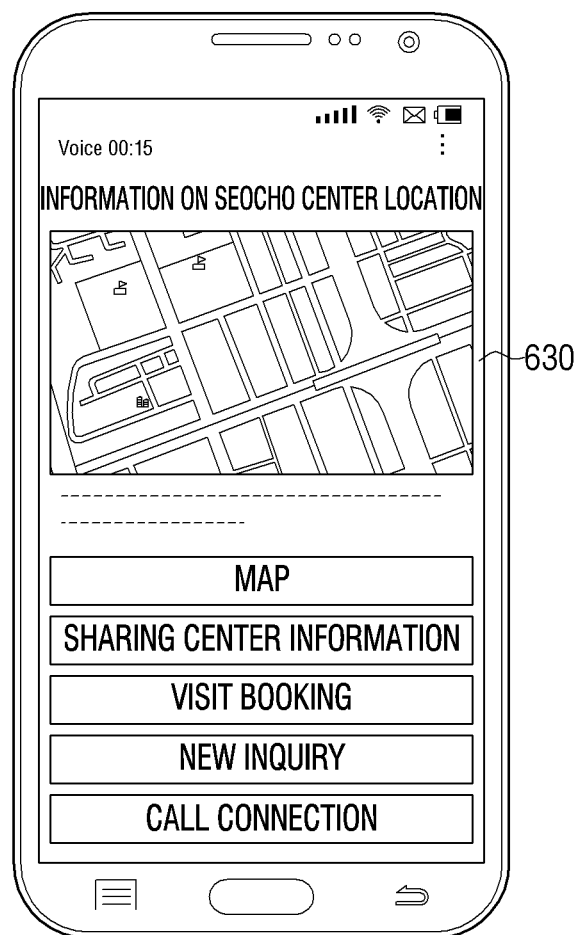

The electronic device 100 may output the voice message regarding the first additional voice "This is Digital Plaza Seocho 2F, at 1341-1, Seocho 2-dong, Seocho-gu, Seoul. You can go straight from Bang Bang juncture toward Nambu Terminal direction by 300 m and find Samsung Digital Plaza at 2F located at Mujigae ATP crossroads. Is your inquiry answered?" through the speaker 140, and as illustrated in FIG. 6C, may provide the guide screen 630 including information (for example, map information and address information) on the Seocho Center in response to the first additional voice on the entire area of the display 110. At this time, as shown in FIG. 6C, the guide screen 630 may include a plurality of icons capable of performing various services as well as information about the center.

While the guide screen 630 is being displayed, if a second additional voice of a user "Where to park a car in Seocho?" through the microphone 150, the electronic device 100 may transmit the input second additional information to the external server 200.

The external server 200 may input the input second additional voice to the AI model to acquire information on the voice and the image including the response to the second additional voice, and transmit the information on the acquired voice and image to the electronic device 100. At this time, the AI model may provide information on the voice and image using merely the second additional voice but may provide information on the voice and image based on the existing speech history (for example, user's voice and first additional voice, etc.). That is, the AI model, if the second additional voice "how to park a car in Seocho?" is input, may provide parking information of Seocho Center, instead of Seocho Gu.

Figure 6D:
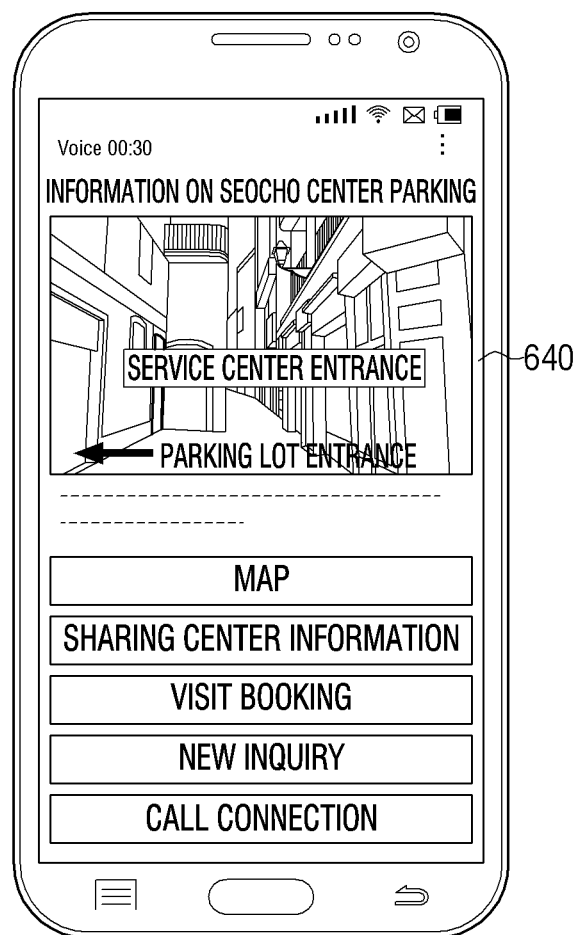

Based on the information on the voice, the electronic device 100 output the voice message on the second additional voice "You can park a car at a basement of a building, and an entrance of a parking lot is at a left side of the building. The parking lot is very crowded and parking may take time due to parking tower, it is recommended to use public transportation. Does this answer your question?" through the speaker 140, and as illustrated in FIG. 6D, may provide a guide screen 640 including parking information (for example, an image of the entrance of the parking lot, parking method, etc.) regarding the Seocho Center, in response to the second additional voice on the entire area of the display 110.

While the guide screen 640 is being displayed, if a user's third additional voice "how long to go to Bangbae Center" is input, the electronic device 100 may transmit the input third additional information to the external server 200.

The external server 200 may input the third additional voice to the AI model, acquire information on the voice and image including a response to the third additional voice and transmit information on the acquired voice and image to the electronic device 100.

Figure 6E:
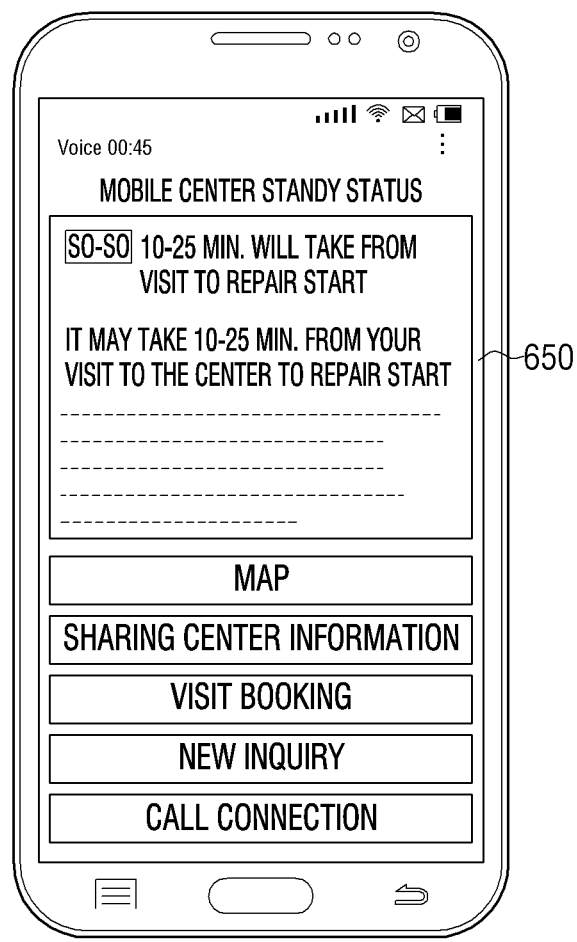

The electronic device 100, based on information on a voice, may output the voice message "The standby state of the service center is normal, it seems to take 10-25 minutes to start repair after you visit the center. Does this answer your question?" regarding the third additional voice through the speaker 140, and as illustrated in FIG. 6E, may provide the guide screen 650 including information (for example, standby time and reservation information, etc.) of Bangbae Center in response to the third additional voice on the entire area of the display 110.

As described above, by receiving a response to the user's voice as voice and an image, a user may receive the response more conveniently and accurately. In addition, by asking information by a user instead of a predetermined voice message, a user may acquire desired information more rapidly.

The electronic device 100 may provide a plurality of icons included in the guide screen as various services.

Figure 7:
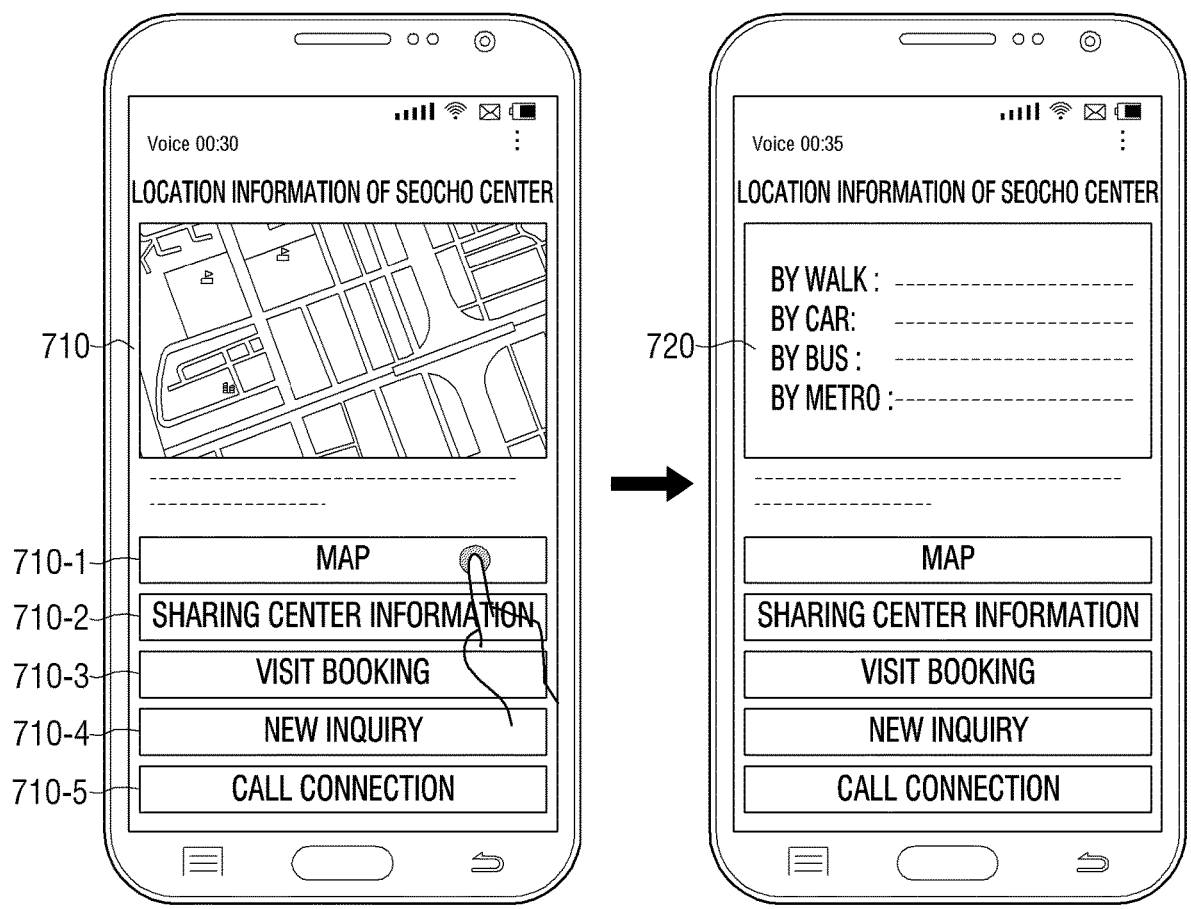
FIGS. 7, 8, and 9 are views to describe embodiments in which a plurality of icons displayed on a guide screen are selected according to an embodiment.

Specifically, as shown on the left side of FIG. 7, the electronic device 100 may provide a guide screen 710 including first to fifth icons (710-1 to 710-5). At this time, the first icon 710-1 may be an icon for confirming information on the "oncoming way," a second icon 710-2 may be an icon for sharing the center information with others, a third icon 710-3 may be icon for center reservation, a fourth icon 710-4 may be an icon for user inquiry, and a fifth icon 710-5 may be an icon for performing a call connection to the center.

While the guide screen 710 is being displayed, when the user input for selecting the first icon 710-1 is received, as shown on the left side of FIG. 7, the electronic device 100 may provide information corresponding to the selected first icon 710-1 on the guide screen 710. For example, the electronic device 100 may provide a guide screen 720 that includes "information about the location and a way to get to the Seocho Center" on the right side of FIG. 7.

Figure 8:
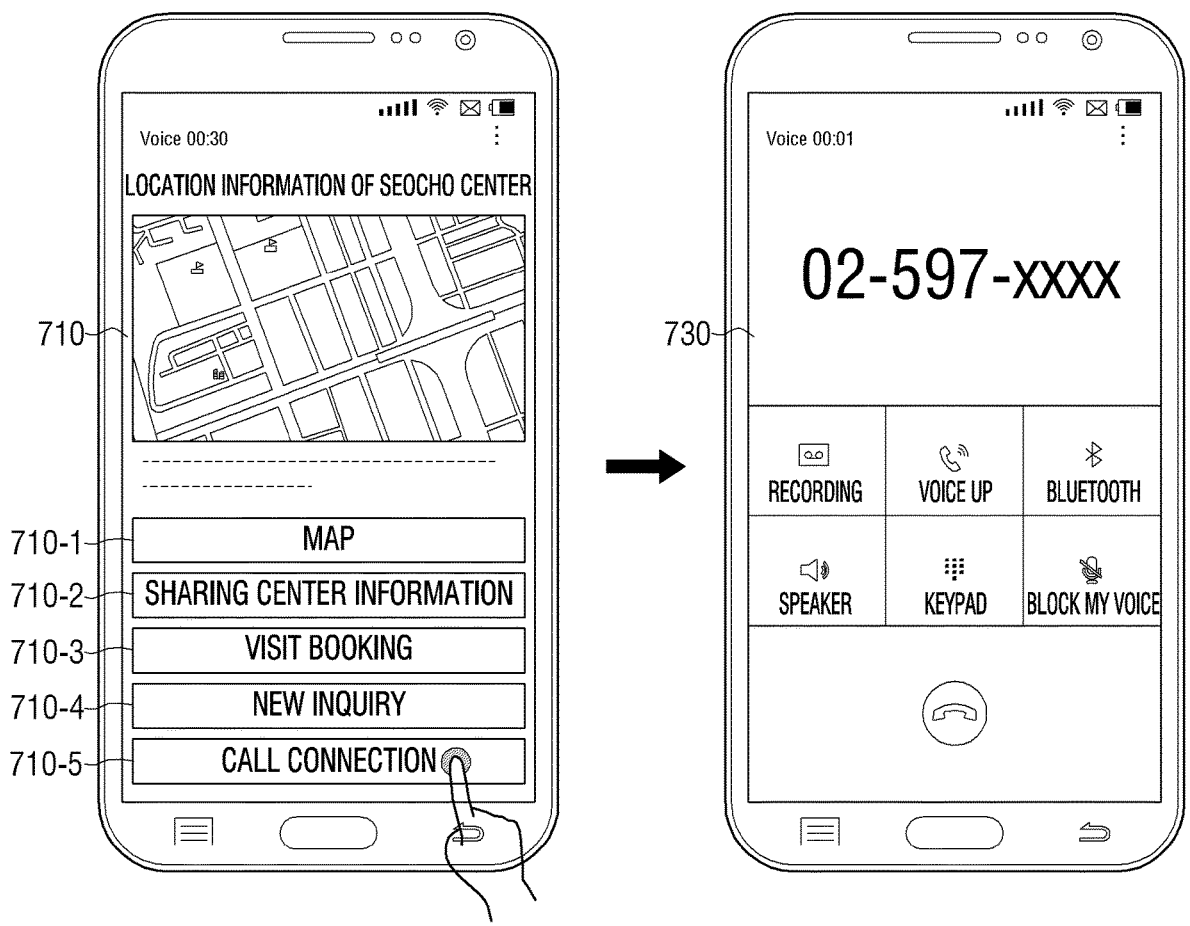

While the guide screen 710 is being displayed, when the user input for selecting the fifth icon 710-5 is received, as shown in the left side of FIG. 8, the electronic device 100 may stop a call connection with the pre-registered telephone number and perform a call connection with the telephone number corresponding to the selected fifth icon 710-5. For example, the electronic device 100 may stop a call connection with a telephone number with which telephone call is conducted, perform a call connection with a telephone number corresponding to the Seocho Center, and as illustrated in the right side of FIG. 8, provide a call screen 730 with the Seocho Center. Here, when the call connection with the Seocho Center is terminated, a notification message inquiring call connection with a pre-registered telephone number may be provided.

Figure 9:
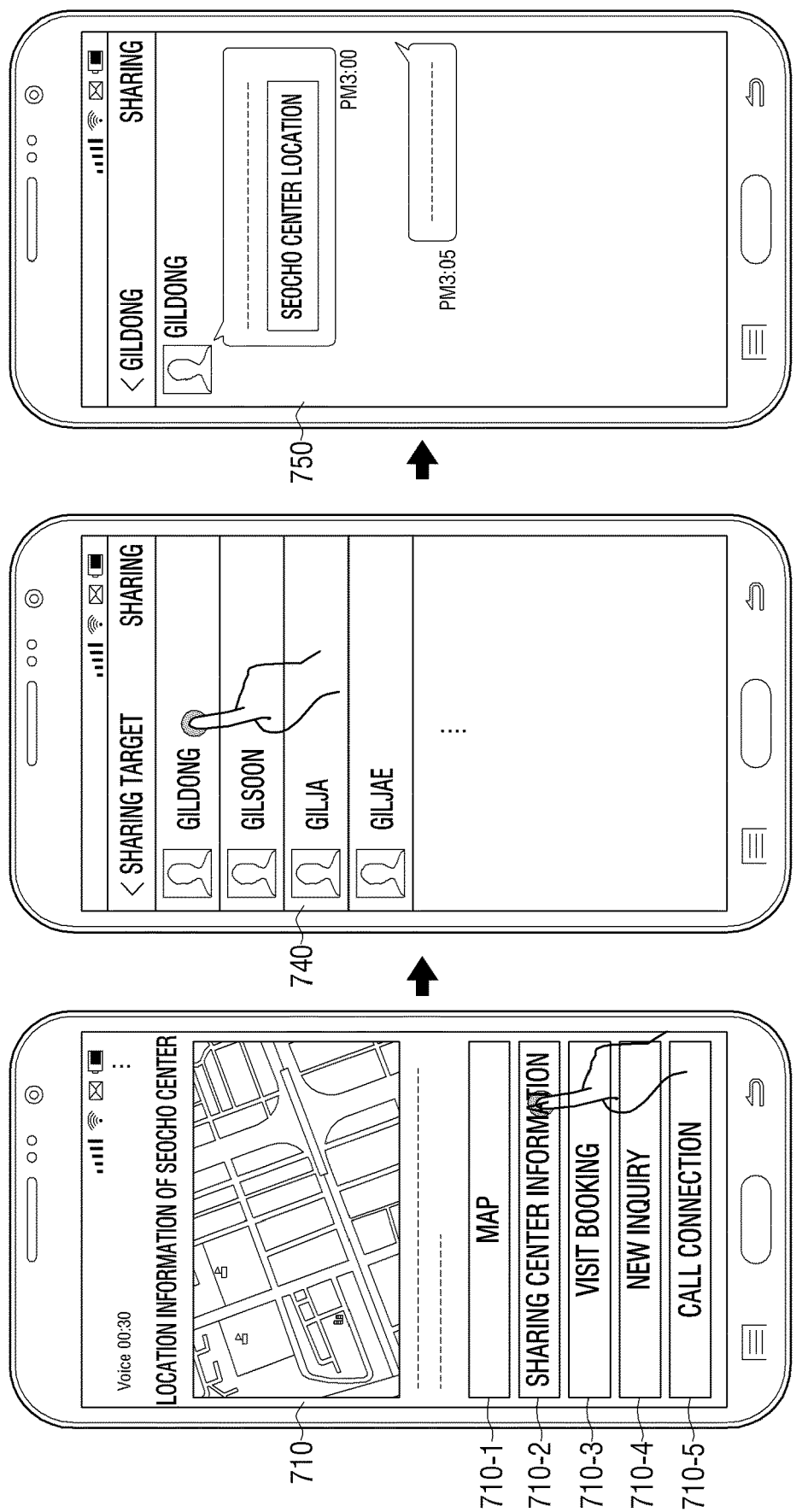

While the guide screen 710 is being displayed, when the user input for selecting the second icon 710-2 is received, as shown on the left side of FIG. 9, the electronic device 100 may provide a UI for transmitting at least a part of information provided on the current guide screen 710 to another electronic device. That is, the electronic device 100, as illustrated in the center of FIG. 9, may provide a UI 740 for selecting a sharing target to share "information on the Seocho Center" from among information provided on the guide screen 710. Here, the UI 740, as illustrated in the center of FIG. 9, may include a UI element to select the sharing target, but this is merely exemplary, and include a UI element for selecting a type of an application to transmit a message.

When at least one of the plurality of sharing targets included in the UI 740 is selected, the electronic device 100 may provide a chat screen 750 with the selected sharing target, as shown on the right side of FIG. 9, and transmit a message including "location information of the Seocho Center."

In addition, the electronic device 100 may provide various services using an application that interworks with an AI dedicated program that is currently running.

Figure 10:
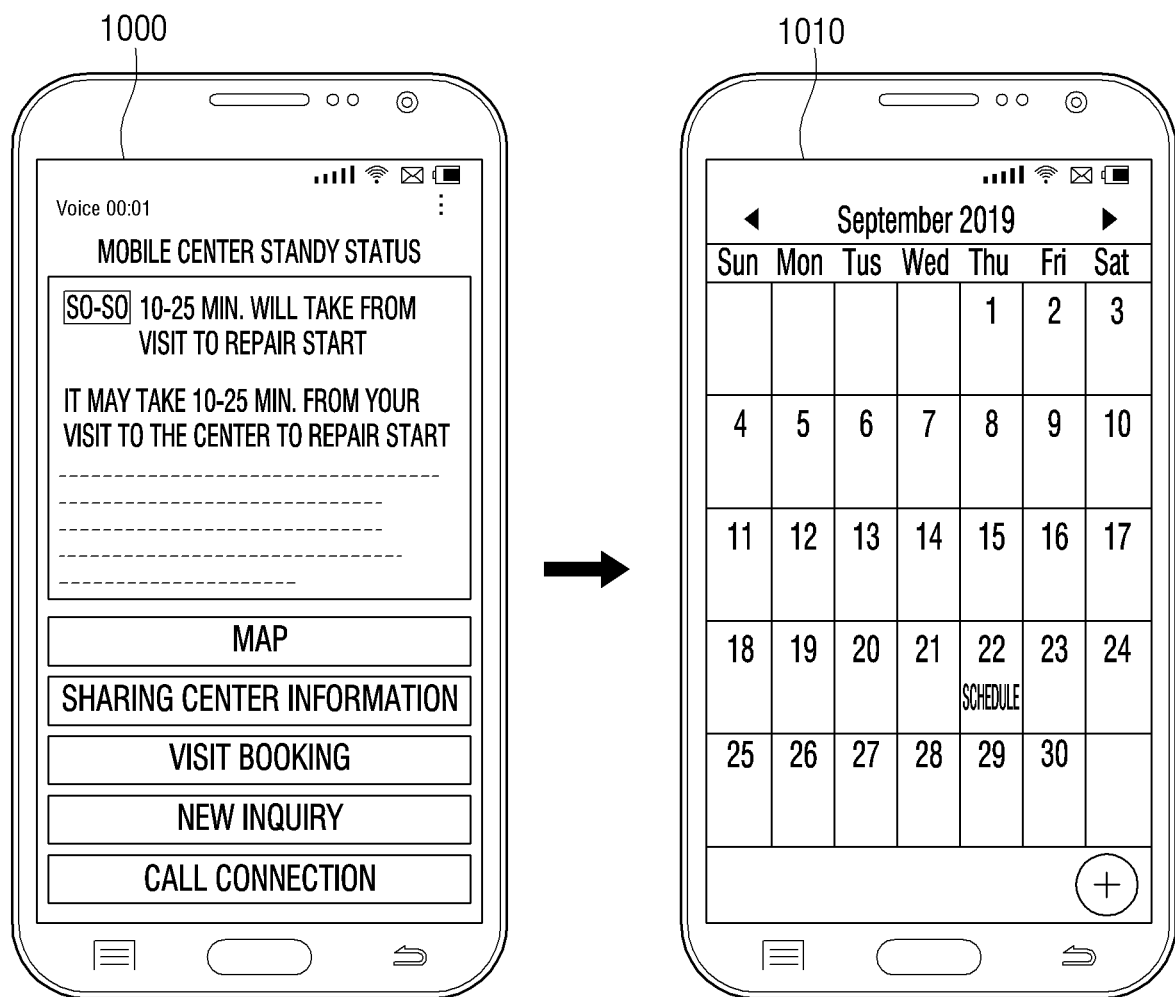
FIG. 10 is a view to describe an embodiment of registering information on additional voice to an interworking application according to an embodiment.

Specifically, when additional voice is input while the guide screen is provided, the electronic device 100 can register information related to the additional voice in an application that interworks with the artificial intelligence dedicated program. For example, as shown in the left side of FIG. 10, when the additional voice of "please make a reservation for visiting on the 22" is input while a guide screen 1000 is displayed, the electronic device 100 may detect a reservation event, and register information on the reserved event in the calendar application intetworking with the artificial intelligence dedicated program. As illustrated in the right side of FIG. 10, the electronic device 100 can provide an execution screen 1010 of a calendar application for confirming a reservation event.

Here, the electronic device 100 may directly recognize an additional voice of a user and detect the reservation event, but this is merely exemplary, and the electronic device 100 may receive information on the reservation event through the external server 200.

Also, while the guide screen is being provided, the electronic device 100 may transmit an image to the external server 200 according to a user command. For example, the electronic device 100 may transmit an external image of a cellular phone photographed by a user to an external destination. At this time, the electronic device 100 can transmit the image to the external server 200 together with the user's voice "the liquid crystal of the mobile phone may be broken."

The external server 200 may input an image and user's voice to the AI model to obtain information on the voice and image and transmit information on the obtained voice and image to the electronic device 100. Here, the information on the voice and image may include information on whether the liquid crystal of a mobile phone is broken.

The electronic device 100 may output a response to the image and the user's voice based on the information about the voice through the speaker 140, and provide a response to the image and user's voice on the guide screen based on information on the image. For example, the electronic device 100 may output voice message "It appears that liquid crystal of your mobile phone is broken. Please visit nearby retailer," based on the information on the voice through the speaker 140, and information on a nearby retailer can be provided on the guide screen based on the information on the image.

Figure 11:
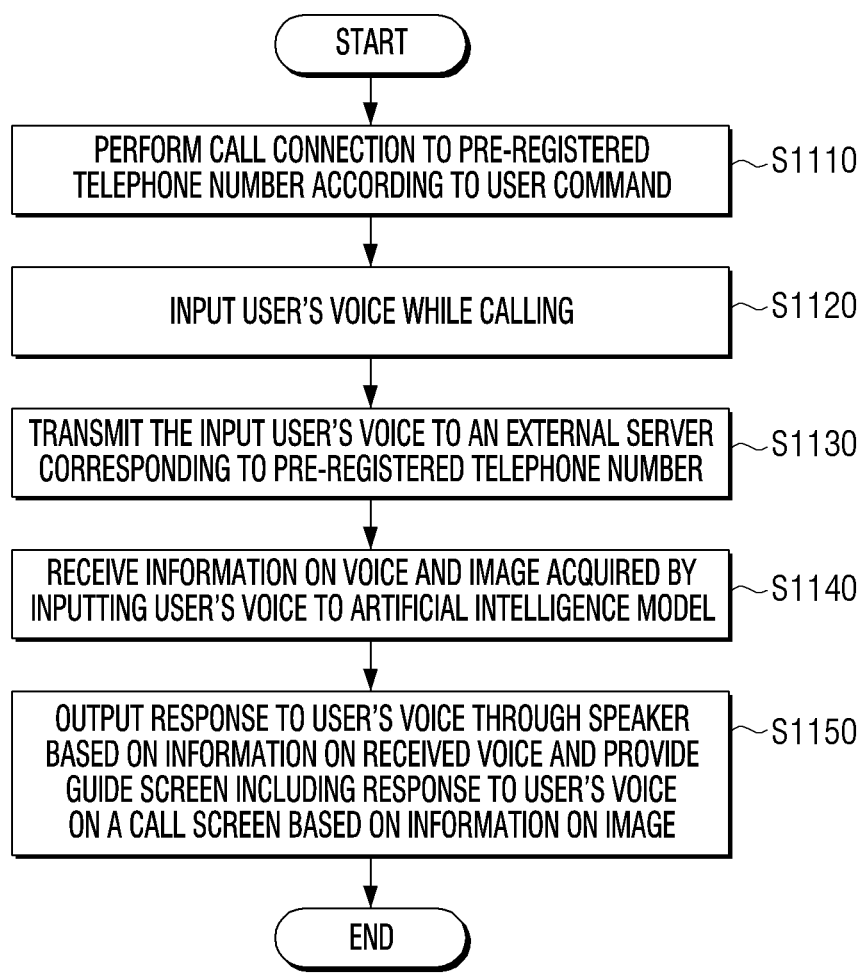
FIG. 11 is a flowchart illustrating a method of controlling the electronic device according to an embodiment.

FIG. 11 is a flowchart illustrating a method of controlling the electronic device according to an embodiment.

The electronic device 100 may perform call connection to the pre-registered telephone number according to a user's command (S1110). Here, when the call connection is performed to the pre-registered telephone number the electronic device 100 may execute the AI dedicated program to provide a response to the user's voice as voice and an image.

The electronic device 100 may receive a user's voice while performing a telephone call (S1120). Here, the user's voice may be voice to inquire about specific information.

The electronic device 100 may transmit the input user's voice to an external server corresponding to the pre-registered telephone number (S1130). According to an embodiment, the electronic device 100 may transmit status information of the electronic device 100 simultaneously or upon request by the external server 200.

The electronic device 100 may receive information on a voice and an image obtained by inputting a user's voice into the artificial intelligence model (S1140). At this time, the information on the voice may be audio data including a response to the user's voice, and the information on the video may include information on text, image, and moving picture including a response to the user's voice, or address information. Further, according to one embodiment of the disclosure, the information about the voice and the image can be obtained by inputting not only the user's voice to the AI model but also the status information of the electronic device 100.

The electronic device 100 may output a response to the user's voice through the speaker based on the received information on the voice and provide a guide screen including a response to the user's voice on the call screen based on information on an image (S1150).

Figure 12:
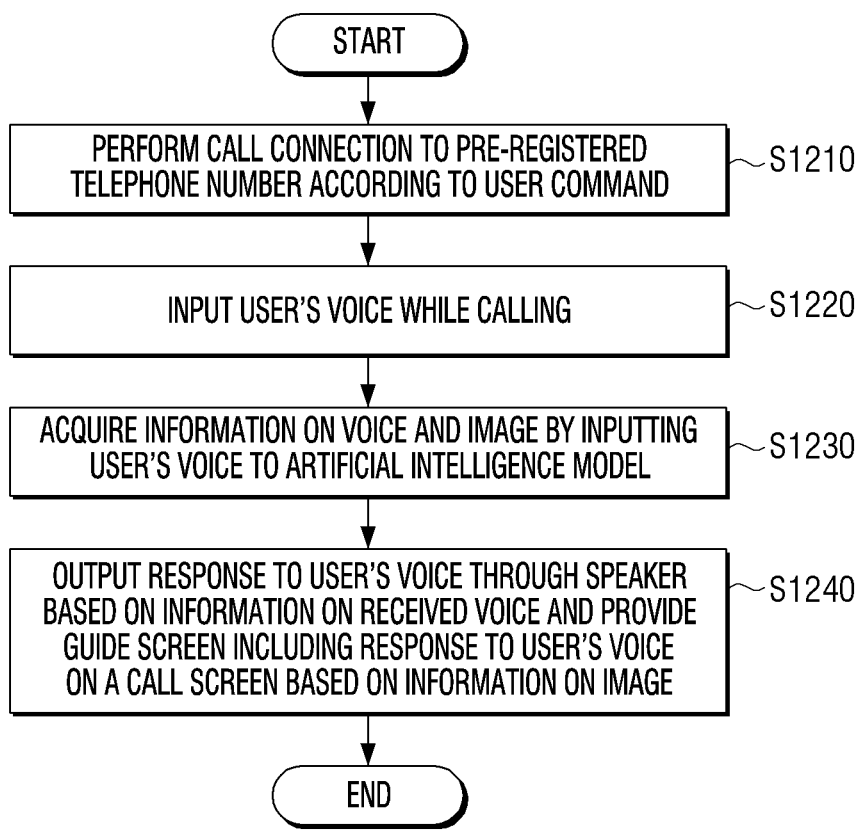
FIG. 12 is a flowchart to describe an embodiment of the electronic device providing a response to a user's voice as a voice and an image.

FIG. 12 is a flowchart to describe an embodiment of the electronic device providing a response to a user's voice as a voice and an image.

The electronic device 100 can perform a call connection to a previously registered telephone number according to a user command (S1210). Here, if the call connection is performed to the pre-registered telephone number, the electronic device 100 can execute a dedicated artificial intelligence program for providing a response to the user's voice not only as a voice but also as an image.

The electronic device 100 may receive a user's voice while performing a telephone call (S1220). Here, the user's voice may be voice to inquire about specific information.

The electronic device 100 may acquire information about the voice and the image by inputting the user's voice into the artificial intelligence model (S1230). That is, the electronic device 100 may store the trained AI model to acquire information about the voice and the image including the response to the voice by inputting the user's voice. The electronic device 100 can then use the stored artificial intelligence model to obtain information about the voice and the image including the response to the user's voice.

At this time, the electronic device 100 can directly input the user's voice into the AI model, but this is merely an embodiment, and the user's voice is converted into text through the external STT server, and then, the converted text can be input to AI model. In addition, the electronic device 100 can acquire audio data by transmitting information on a voice in a text form including a response to the user voice input through the artificial intelligence model to an external TTS server.

The electronic device 100 may output a response to the user's voice through a speaker based on information on voice and provide a guide screen including a response to the user's voice on a call screen based on information on an image (S1240).

Figure 13:
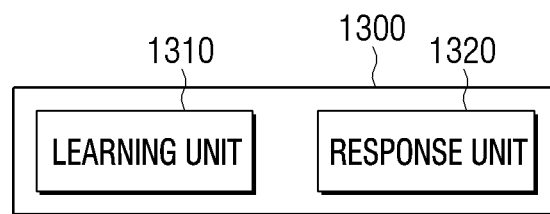
FIG. 13 is a block diagram illustrating a configuration of an external device to learn and use an artificial intelligence model providing a response to a user's inquiry according to an embodiment.

FIG. 13 is a block diagram illustrating a configuration of an external device to learn and use an artificial intelligence model providing a response to a user's inquiry according to an embodiment.

Referring to FIG. 13, an external server 1300 may include at least one of a learning unit 1310 and a response unit 1320. The external server 1300 of FIG. 13 may correspond to a second external server 200-2 of FIG. 2.

The learning unit 1310 may generate or train an AI model having a criteria for providing a response to a user's voice using learning data. The learning unit 1310 may generate a determination model having a determination criterion using the collected learning data.

For example, the learning unit 1310 may learn to acquire information about a voice and an image including a response to a user voice as learning data of a user's voice. Also, the learning unit 1310 may generate, learn, or update an artificial intelligence model for providing information on the voice and the image including the response to the user voice, using the user voice and the state information of the electronic device as learning data.

The response unit 1320 may, using the predetermined data as input data of the trained AI model, acquire information on a voice and image including a response to the predetermined user's voice.

For example, the response unit 1320 may acquire (or estimate, infer) information on a voice and an image including a response to a user voice using the user voice and state information of the electronic device as input data of the artificial intelligence model.

In one embodiment of the disclosure, the learning unit 1310 and the response unit 1320 may be included in the external server 1300, hut this is merely an example, and can be provided inside the electronic device 100. To be specific, at least a portion of the learning unit 1310 and at least a portion of the response unit 1320 may be implemented in software modules or in the form of at least one hardware chip and mounted in the electronic device 100. For example, at least one of the learning unit 1310 and the response unit 1320 may be manufactured in the form of a dedicated hardware chip for artificial intelligence (AI) or a conventional general purpose processor (e.g., a CPU or an application processor) or a graphics-only processor (e.g., GPU) and may be mounted on the various electronic devices described above. At this time, the dedicated hardware chip for artificial intelligence is a special processor specialized in probability calculation, and it has a higher parallel processing performance than the conventional general processor, so that it is possible to quickly process the artificial intelligence field such as machine learning. When the learning unit 1310 and the response unit 1320 are implemented as a software module (or a program module including an instruction), the software module may be stored in a non-transitory computer readable media. In this case, the software module may be provided h an operating system (OS) or by a predetermined application. Alternatively, some of the software modules may be provided by an Operating System (OS), and some of the software modules may be provided by some applications.

In this case, the learning unit 1310 and the response unit 1320 may be mounted on one electronic device or on separate electronic devices, respectively. For example, one of the learning unit 1310 and the response unit 1320 may be included in the electronic device 100, and the other one may be included in an external server. The learning unit 1310 and the response unit 1320 may provide the model information constructed by the learning unit 1310 to the response unit 1320 via the wired or wireless communication system, and the data may be provided to the learning unit 1310 as additional learning data.

Figure 14A:
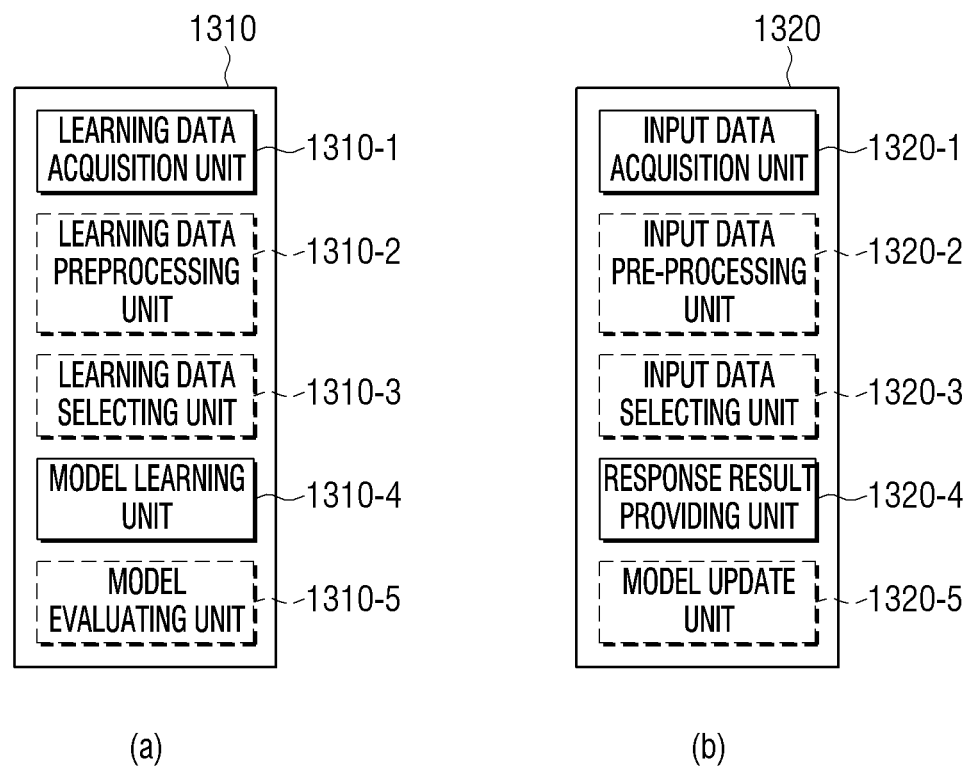
FIGS. 14A and 14B are block diagrams illustrating a configuration of a learning unit and a determination unit according to an embodiment.

FIG. 14A is a block diagram of the learning unit 1310 and the response unit 1320 according to an embodiment.

Referring to FIG. 14A, the learning unit 1310 according to an embodiment may include a learning data acquisition unit 1310-1 and a model learning unit 1310-4. The learning unit 1310 may further include a learning data preprocessing unit 1310-2, a learning data selecting unit 1310-3, and a model evaluating unit 1310-5.

The learning data acquisition unit 1310-1 may acquire learning data necessary for the artificial intelligence model to acquire a response to the user's voice. In the embodiment of the disclosure, the learning data acquisition unit 1310-1 can acquire user speech as learning data. Further, the learning data acquisition unit 1310-1 can acquire, as learning data, information (for example, state information of the electronic device) necessary for obtaining a concrete response to the user's voice. The learning data may be data collected or tested by the learning unit 1310 or the manufacturer of the learning unit 1310.

The model learning unit 1310-4 can use the learning data so that the artificial intelligence model has a criterion for acquiring a response to the user's Voice. For example, the model learning unit 1310-4 can learn an artificial intelligence model through supervised learning using at least some of the learning data as a reference for acquiring a response to the user's voice. Alternatively, the model learning unit 1310-4 may learn, for example, self-learning using learning data without any guidance, thereby generating an artificial intelligence model through unsupervised learning. Also, the model learning unit 1310-4 can learn the artificial intelligence model through reinforcement learning using, for example, feedback as to whether the result of providing a response according to learning is correct. Further, the model learning unit 1310-4 can learn the artificial intelligence model using, for example, a learning algorithm including an error back-propagation method or a gradient descent.

The model learning unit 1310-4 may learn a selection criteria as to what kind of learning data should be used to provide information on a voice and image including a response to the user's voice using the input data.

The model learning unit—1310-4 can determine an artificial intelligence model having a large relation between the input learning data and the basic learning data as an artificial intelligence model to be trained, when a plurality of artificial intelligence models exist in advance. In this case, the basic learning data may be pre-classified according to the data type, and the artificial intelligence model may be pre-built for each data type. For example, the basic learning data may be pre-classified by various criteria such as an area in which the learning data is generated, a time at which the learning data is generated, a size of the learning data, a genre of the learning data, a creator of the learning data, and types of objects within the learning data, and so on.

When the artificial intelligence model is trained, the model learning unit—1310-4 can store the trained artificial intelligence model. In this case, the model learning unit 1310-4 can store the trained artificial intelligence model in the memory of the external server 1300. Alternatively, the model learning unit 1310-4 may store the trained artificial intelligence model in a memory of a server or an electronic device connected to the external server 1300 via a wired or wireless network.

The learning unit 1310, in order to improve a response result of the AI model or save resources or time required to generate an AI model, may further include the learning data preprocessing unit 1310-2 and the learning data selecting unit 1310-3.

The learning data preprocessing unit 1310-2 can preprocess acquired data so that the acquired data can be used for learning to acquire information including a response to the user's voice. The learning data preprocessing unit 1310-2 processes the acquired data into a predetermined format so that the model learning unit 1310-4 can use the acquired data to obtain information including a response to the user's voice. For example, the learning data preprocessing unit 1310-2 may remove unnecessary text (e.g., adverbs, exclamations, etc.) from the input user voice when the AI model provides a response.

The learning data selecting unit 1310-3 may select data necessary for learning from among data obtained from the learning data acquisition unit 1310-1 or pre-processed data by the learning data preprocessing unit 1310-2. The selected learning data may be provided to the model learning unit 1310-4. The learning data selection unit 1310-3 can select the learning data necessary for learning from the acquired or preprocessed data according to a predetermined selection criterion. The learning data selecting unit 1310-3 may also select the learning data according to a predetermined selection criterion by learning by the model learning unit 1310-4.

The learning unit 1310, in order to improve a response result of the AI model, may further include the model evaluating unit 1310-5.

The model evaluating unit 1310-5 may input evaluation data to the AI model, and if the response result that is input from the evaluation data does not meet a predetermined criterion, may iteratively cause the model learning unit 1310-4 learn again. In this case, the evaluation data may be predefined data to evaluate the AI model.

For example, the model evaluating unit 1310-5 may, from among a response result of the AI model that is trained with respect to evaluation data, if the number or ratio of the evaluation data of which a response result is not correct exceeds a preset threshold value, may evaluate that the predetermined criterion is not satisfied.

In the meantime, when there are a plurality of trained artificial intelligence models, the model evaluating unit—1310-5 may evaluate whether each of the trained artificial intelligence models satisfies a predetermined criterion, and determine a model satisfying a predetermined criterion as the final artificial intelligence model. In this case, when there are a plurality of models satisfying a predetermined criterion, the model evaluating unit 1310-5 can determine any one or a predetermined number of models preset in descending order of the evaluation score as the final artificial intelligence model.

Referring to (b) of FIG. 14A, the response unit 1320 according to an embodiment may include an input data acquisition unit 1320-1 and a response result providing unit 1320-4.

The response unit 1320 may further include the input data preprocessing unit 1320-2, the input data selecting unit 1320-3, and the model update unit 1320-5 selectively.

The input data acquisition unit 1320-1 can obtain data necessary for obtaining a response to the user's voice. The response result providing unit 1320-4 applies the input data obtained by the input data obtaining unit 1320-1 to the trained artificial intelligence model as an input value, and outputs information about the voice and the image including the response to the user's voice. The response result providing unit 1320-4 applies the data selected by the input data preprocessing unit 1320-2 or the input data selecting unit 1320-3 to be described later to the AI model to obtain a response result. The response result can be determined by the AI model.

As an embodiment, the response result providing unit 1320-4 may apply the user's voice obtained by the input data acquisition unit 1320-1 and the electronic device to a trained AI model to obtain information on a voice and image including a response to the user's voice.

The response unit 1320, in order to improve a response result of the AI model or save resources or time to provide a response result, may further include the input data preprocessing unit 1320-2 and the input data selecting unit 1320-3.

The input data preprocessing unit 1320-2 can preprocess acquired data so that the acquired data can be used to obtain a response to the user's voice. The input data preprocessing section 1320-2 can process the acquired data into a predefined format so that the response result providing section 1320-4 can use the acquired data to obtain a response to the user's voice.

The input data selecting unit 1320-3 can select the data acquired by the input data acquiring unit 1320-1 or the data necessary for providing the response from the data preprocessed by the input data preprocessing unit 1320-2. The selected data may be provided to the response result providing unit 1320-4. The input data selecting unit 1320-3 can select some or all of the obtained or preprocessed data according to a predetermined selection criterion for providing a response. The input data selecting unit 1320-3 can also select data according to a predetermined selection criterion by teaming by the model learning unit 1310-4.

The model update unit 1320-5, based on the response result provided by the response result providing unit 1320-4, may control so that the AI model is updated. For example, the model update unit 1320-5 may provide the response result provided by the response result providing unit 1320-4 to the model learning unit 1310-4 to request that the model learning unit 1310-4 additionally learn or update the AI model.

Figure 14B:
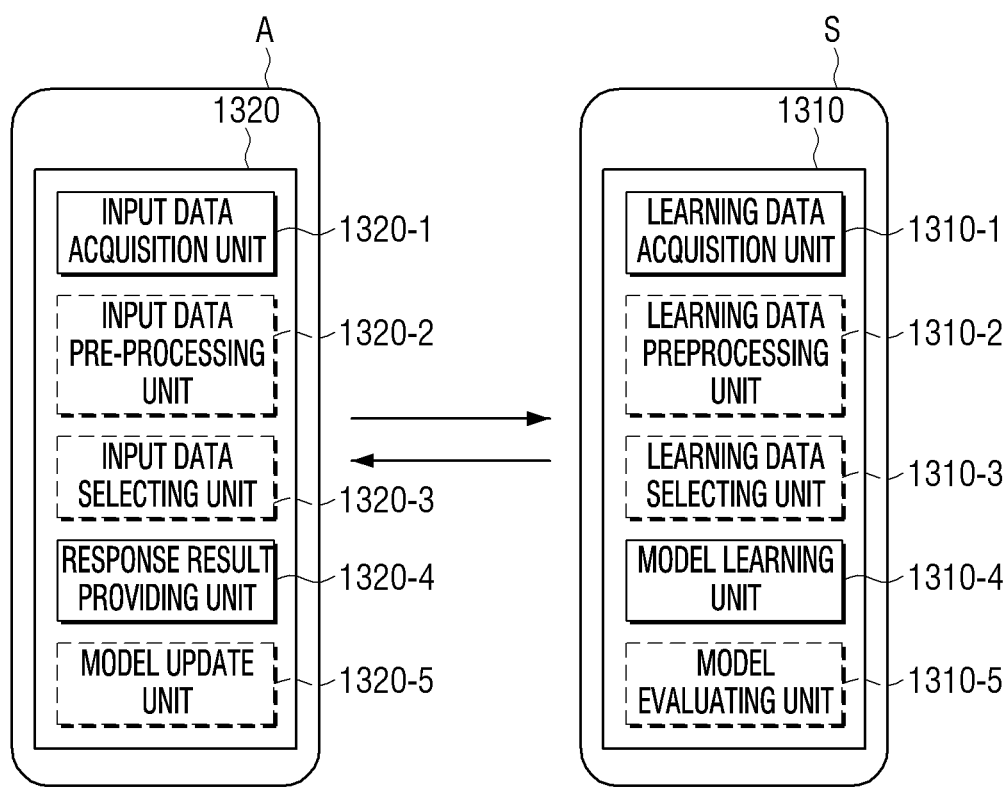

FIG. 14B is a view to illustrate an example in which the electronic device 100 and the external server (S) interlock with each other to learn and determine data.

Referring to FIG. 14B, the external server (S) av learn a criterion to obtain information including a response to the user's voice and the electronic device 100 may provide a response to the user's voice through a voice and image based on a learning result by the server (S).

In this case, the model learning unit 1310-4 of the server (S) may perform a function of the learning unit 1310 illustrated in FIG. 13. That is, the model learning unit 1310-4 of the server (S) may learn a criterion on whether to use text information or status information of the electronic device to obtain a response to the user's voice or how to acquire a response to the user's voice using the information.

In addition, the response result providing unit 1320-4 of the electronic device 100 may apply the data selected by the input data selecting unit 1320-3 to the AI model generated by the server (S) to obtain a response to the user's voice. Alternatively, the response result providing unit 1320-4 of the electronic device 100 may receive an AI model generated by the server 50 from the server 50 and obtain a response to the user's voice using the received AI model.

Figure 15:
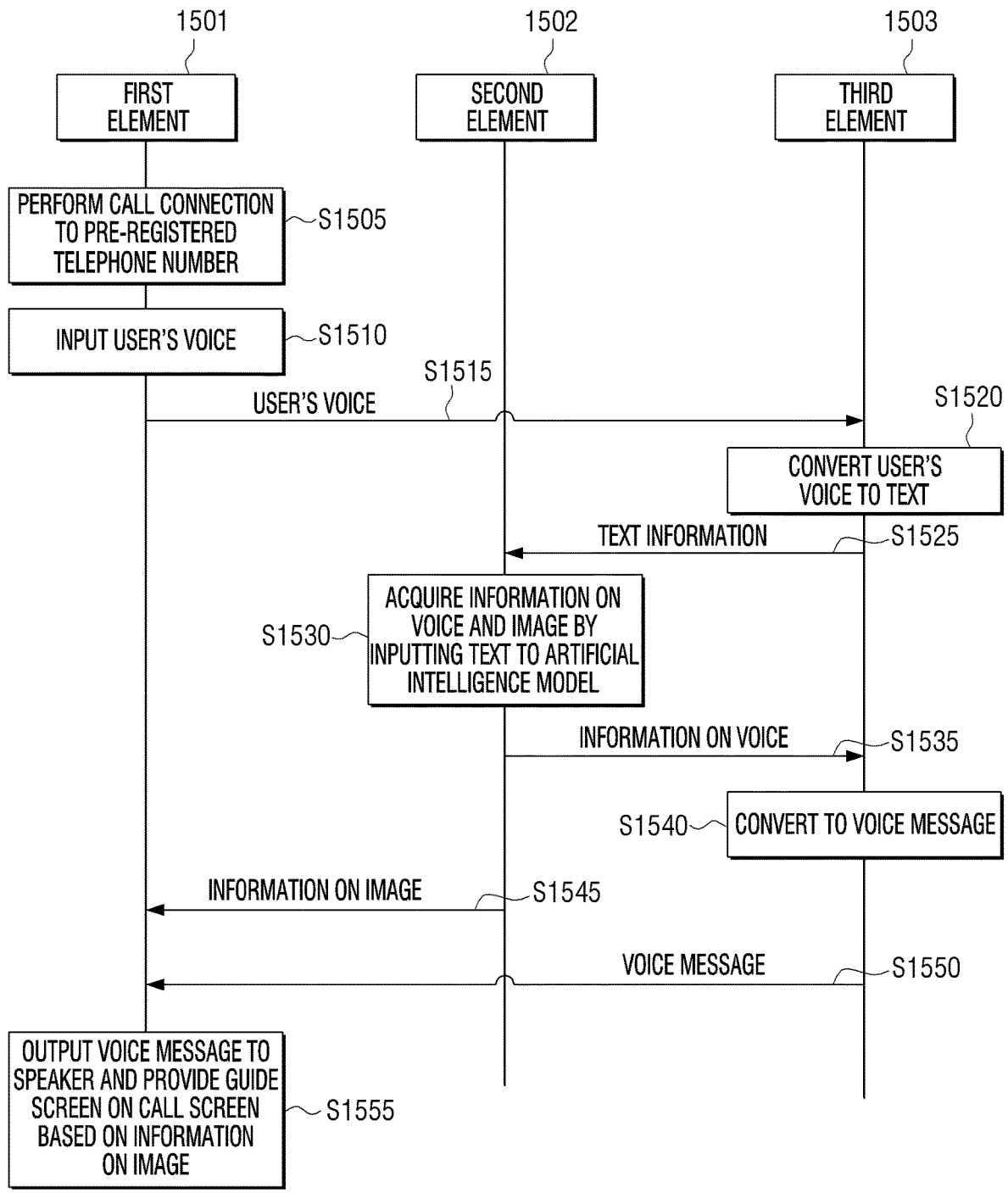
FIG. 15 is a flowchart of network system using an artificial intelligence model according to an embodiment.

FIG. 15 is a flowchart of network system using an artificial intelligence model according to an embodiment.

In FIG. 15, the network system using the AI model may include a first element 1501, a second element 1502 and a third element 1503.

Here, the first element 1501 may be the electronic device 100 and the second element 1502 may be the server S storing the determination model. Alternatively, the first element 1501 may be a general purpose processor and the second element 1502 may be an artificial intelligence dedicated processor. Alternatively, the first element 1501 may be at least one application, and the second element 1502 may be an operating system (OS). That is, the second element 1502 may be more integrated than the first element 1501, may be dedicated, have less processing delay, have a performance advantage, and may be an element that can process many operations that are required at the time of update or application more quickly and efficiently than the first element 1501.

Here, an interface for transmitting and receiving data between the first element 1501 and the second element 1502 may be defined. For example, an application program interface (API) having learning data to be applied to a judgment model as an argument value (or an intermediate value or a transfer value) may be defined. The API may be defined as a set of subroutines or functions that can be invoked for any processing of another protocol (e.g., a protocol defined in server S) in any one protocol (e.g., a protocol defined in electronic device 100). That is, an environment can be provided in which an operation of another protocol can be performed through any one protocol through the API.

The third element 1503 may be implemented as the first server 200-1 to convert a user's voice in an audio format to a text or convert a text to a voice message.

In FIG. 15, the first element 1501 may perform a call connection to a pre-registered telephone number (S1505). Here, the pre-registered telephone number is a number to request specific information or receive a specific service, and can be implemented as various telephone numbers such as a customer service telephone number, a restaurant reservation telephone number, and a travel booking number, or the like.

The first element 1501 may receive the user's voice through a microphone (S1510). Here, the user's voice may be a voice to inquire about specific information.

The first element 1501 may transmit the input user's voice to the third element 1503 (S1515). Here, the user's voice may be in a format of audio data.

The third element 1503 may convert the received user's voice to a text (S1520). To be specific, the third element 1503 may convert the user's voice in a format of audio to the text using the STT technology.

The third element 1503 may transmit the converted text to the second element 1502 (S1525).

The second element 1502 may input a text to the AI model to obtain information on a voice and an image (S1530). Here, the AI model may be a model that is trained to obtain information on a voice and image including a response to the user's voice by inputting a text. In addition, information on the obtained voice and image through the AI model may include a response to the user's voice.

The second element 1502 may transmit information on voice to the third element 1503 (S1535). Here, information on the voice may be text data including information requested by the user.

The third element 1503 may convert information on the voice to the voice message (S1540). That is, the third element 1503 may convert information on the voice in a format of text data to voice message (that is audio format) using TTS technology.

The second element 1502 may transmit information on an image to the first element 1501 (S1545), and the third element 1503 may transmit a voice message to the first element 1501 (S1550). Here, the information on the image may include at least one of a text, image, and a video, and may be information on a webpage to provide at least one of text, image, and video.

The first element 1501 may output the voice message received from the third element 1503 to the speaker and display the guide screen on the call screen based on information on the received image (S1555). At this time, the guide screen may include a response to the user's voice, and may include a UI for receiving user commands as well as text, images, and moving pictures.

Various embodiments of the disclosure may be implemented in software, including instructions stored on machine-readable storage media readable by a machine (e.g., a computer) (E. G, Electronic device 100) in accordance with the disclosed embodiments, as an apparatus capable of calling stored instructions and operating in accordance with the called instructions. When the instructions are executed by a processor, the processor may perform functions corresponding to the instructions, either directly or under the control of the processor, using other elements. The instructions may include code generated or executed by the compiler or interpreter. The storage medium may be provided in the form of a non-transitory storage medium, where "non-temporary" means that the storage medium does not contain a signal and it only means that it is tangible, and does not distinguish that data is permanently or temporarily stored in a storage medium.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™). In the case of on-line distribution, at least a portion of the computer program product may be stored temporarily or at least temporarily in a storage medium such as a manufacturer's server, a server of an application store, or a memory of a relay server.

Each of the elements (for example, a module or a program) according to various embodiments may be composed of a single entity or a plurality of entities, and some subelements of the abovementioned subelements may be omitted. The elements may be further included in various embodiments. Alternatively or additionally, some elements (e.g., modules or programs) may be integrated into one entity to perform the same or similar functions performed by each respective element prior to integration. Operations performed by a module, program, or other element, in accordance with various embodiments, may be performed sequentially, in a parallel, repetitive, or heuristically manner, or at least some operations may be performed in a different order.

What is claimed is:

1. A method of controlling an electronic device, the method comprising:
    establishing a call connection to a telephone number based on receiving a user input;
    receiving a first voice of a user while performing the call;
    transmitting information of the first voice of the user to an external server storing a trained artificial intelligence model corresponding to the telephone number;
    receiving, from the external server, a first text data and a first image data corresponding to the first voice of the user, the first text data and the first image data obtained by inputting the information of the first voice of the user to the trained artificial intelligence model on the external server;
    outputting the first text data and the first image data as a response to the first voice of the user;
    receiving a second voice of the user while outputting the first text data and the first image data;
    transmitting information of the second voice of the user to the external server;
    receiving, from the external server, a second text data and an second image data corresponding to the second voice of the user, the second text data and the second image data obtained by inputting the information of the second voice of the user to the trained artificial intelligence model on the external server; and
    outputting the second text data and the second image data as a response to the second voice of the user.

2. The method of claim 1, further comprising:
    transmitting, to the external server, information on an image according to a user command while the first image data is being provided;
    receiving, from the external server, a text data and an image data corresponding to the image by applying the information on the image to the trained artificial intelligence model on the external server; and
    outputting the text data and the image data corresponding to the image as a response to the image.

3. The method of claim 1, the further comprising:
    in response to the call connection to the telephone number being established, executing an artificial intelligence dedicated program to provide the response to the first voice of the user as an audible voice and a visual image.

4. The method of claim 3, further comprising:
    receiving an additional voice of the user while the first image data is being provided on a screen of the electronic device; and
    registering information relating to the additional voice of the user to an application that interworks with the artificial intelligence dedicated program.

5. The method of claim 1, further comprising:
    in response to a command to register the telephone number being input, registering the telephone number and the external server corresponding to the telephone number.

6. The method of claim 1, wherein the outputting comprises:
    providing a user interface (UI) screen including at least one icon based on the first image data; and
    in response to an icon of the at least one icon included in the UI screen being selected, providing information corresponding to the icon on the UI screen.

7. The method of claim 6, further comprising:
    in response to a second icon of the at least one icon included in the UI screen being selected, stopping the call connection with the telephone number and establishing a new call connection with a new telephone number corresponding to the second icon.

8. The method of claim 6, further comprising:
    in response to a second icon of at least one icon included in the UI screen being selected, providing a UI to transmit information provided to the UI screen to another electronic device.

9. An electronic device comprising:
    a display;
    a speaker;
    a microphone;
    a communication unit;
    a memory storing computer-readable instructions; and
    a processor electrically connected to the display, the speaker, the microphone, the communication unit, and the memory, wherein the processor when executing the computer-readable instructions is configured to control the electronic device to:
    establish a call connection to a telephone number based on receiving a user input,
    receive a first voice of a user while performing the call,
    control the communication unit to transmit information of the first voice of the user to an external server storing a trained artificial intelligence model corresponding to the telephone number,
    receive, from the external server, a first text data and a first image data corresponding to the first voice of the user, the first text data and the first image data obtained by inputting the information of the first voice of the user to the trained artificial intelligence model on the external server;
    output the first text data and the first image data as a response to the first voice of the user,
    receive a second voice of the user while outputting the first text data and the first image data, control the communication unit to transmit information of the second voice of the user to the external server, receive, from the external server, a second text data and a second image data corresponding to the second voice of the user, the second text data and the second image data obtained by inputting the information of the second voice of the user to the trained artificial intelligence model on the external server; and output the second text data and the second image data as a response to the second voice of the user.

10. The electronic device of claim 9, wherein the processor is further configured to:

control the communication unit to transmit, to the external server, information on an image according to a user command while the first image data is being provided;

receive, from the external server, a text data and an image data corresponding to the image by applying the information on the image to the trained artificial intelligence model on the external server; and output the text data and the image data corresponding to the image as a response to the image.

11. The electronic device of claim 9, wherein the processor, in response to the call connection to the telephone number being established, is further configured to execute an artificial intelligence dedicated program to provide the response to the first voice of the user as an audible voice and a visual image.

12. The electronic device of claim 11, wherein the processor is further configured to:

receive an additional voice of the user while the first image data is being provided on a screen of the electronic device; and register information relating to the additional voice of the user to an application that interworks with the artificial intelligence dedicated program.

13. The electronic device of claim 9, wherein the processor, in response to a command to register the telephone number being input, is further configured to register the telephone number and the external server corresponding to the telephone number.

14. The electronic device of claim 9, wherein the processor is further configured to:

provide a user interface (UI) screen including at least one icon based on the first image data, and in response to an icon of at least one icon included in the UI screen being selected, controls the display to provide information corresponding to the icon on the UI screen.

15. The electronic device of claim 14, wherein the processor, in response to a second icon of at least one icon included in the UI screen being selected, is further configured to stop the call connection with the telephone number and establish a new call connection with a new telephone number corresponding to the second icon.

16. The electronic device of claim 14, wherein the processor, in response to a second icon of at least one icon included in the UI screen being selected, is further configured to control the display to provide a UI to transmit information provided to the UI screen to another electronic device.

* * * * *